United States Patent [19]
Ayyagari et al.

[11] Patent Number: 6,018,659
[45] Date of Patent: Jan. 25, 2000

[54] AIRBORNE BROADBAND COMMUNICATION NETWORK

[75] Inventors: Arun Ayyagari, Seattle; Jeff P. Harrang; Sankar Ray, both of Redmond, all of Wash.

[73] Assignee: The Boeing Company, Seattle, Wash.

[21] Appl. No.: 08/845,548

[22] Filed: Apr. 24, 1997

Related U.S. Application Data

[60] Provisional application No. 60/028,714, Oct. 17, 1996.

[51] Int. Cl.$^7$ .................................................. H04Q 7/36
[52] U.S. Cl. .......................... 455/431; 455/456; 342/357; 342/450; 701/214
[58] Field of Search ................................. 455/12.1, 13.2, 455/13.3, 427, 429, 430, 431, 11.1; 342/2, 352, 355, 357, 450, 454, 458, 463; 701/213, 214

[56] References Cited

U.S. PATENT DOCUMENTS

| | | |
|---|---|---|
| 2,571,386 | 10/1951 | Sarnoff . |
| 2,579,591 | 12/1951 | Ley et al. . |
| 2,626,348 | 1/1953 | Nobles . |
| 2,748,266 | 5/1956 | Boyd . |
| 3,742,358 | 6/1973 | Cesaro . |
| 4,868,886 | 9/1989 | Assal et al. . |
| 4,926,422 | 5/1990 | Alaria et al. . |
| 5,027,126 | 6/1991 | Basehgi et al. . |
| 5,099,245 | 3/1992 | Sagey ........................................ 342/357 |
| 5,168,498 | 12/1992 | Adams et al. . |
| 5,303,286 | 4/1994 | Wiedeman . |
| 5,410,728 | 4/1995 | Bertiger et al. . |
| 5,433,726 | 7/1995 | Horstein et al. . |
| 5,434,854 | 7/1995 | Focarile et al. . |
| 5,438,565 | 8/1995 | Hemmady et al. . |
| 5,444,762 | 8/1995 | Frey et al. . |
| 5,463,656 | 10/1995 | Polivka et al. . |
| 5,471,641 | 11/1995 | Dosiere et al. . |
| 5,481,258 | 1/1996 | Fawcett et al. . |
| 5,526,404 | 6/1996 | Wiedeman et al. . |
| 5,543,811 | 8/1996 | Chethik ................................... 343/844 |
| 5,548,292 | 8/1996 | Hirshfield et al. . |
| 5,612,703 | 3/1997 | Mallinckrodt ........................... 342/457 |
| 5,736,959 | 4/1998 | Patterson et al. ....................... 455/13.3 |
| 5,847,679 | 12/1998 | Yee et al. ................................ 342/357 |

FOREIGN PATENT DOCUMENTS

| | | |
|---|---|---|
| 500221 | 11/1949 | Canada . |
| 3-104426 | 2/1991 | Japan . |
| 358972 | 10/1931 | United Kingdom . |

OTHER PUBLICATIONS

Brendler, Joseph A., "Tactical Military Communications," *IEEE Communications Magazine*, Jan., 1992.

Eng, K.Y. et al., "A Wireless Broadband Ad–hoc ATM Local–Area Network," *Wireless Networks* 1:161–174 (1995).

Sass, P.F. et al., "Communications for the Digitized Battlefield of the 21st Century," *IEEE Communications Magazine*, Oct., 1995.

"Aerostat–Borne Broadcast System," *ABO Tech. Rev.* 52, (Japan, 1997).

*Primary Examiner*—Paul Loomis
*Assistant Examiner*—Binh K. Tieu
*Attorney, Agent, or Firm*—Christensen O'Connor Johnson & Kindness; Lawrence W. Nelson

[57] ABSTRACT

A deployed group of airborne vehicles (AV) provide relay communication service among mobile and airborne customers by using a directed phased array antenna (PAA). The PAAs provide broadband communication with mobile customers. Each AV has a wireless link to one or more neighboring AVs forming an airborne inter-networked mesh constellation for routing traffic between mobile customers. The AV constellation includes gateway members that maintain high capacity point-to-point satellite or terrestrial base station links for communication connectivity outside the aggregate coverage area of the AV constellation. A constellation is managed by an operations control center whose duties include positioning and scheduling replacement of the constellation AVs and routine network management functions, to implement the rapidly deployable, broadband, mobile, wireless communication network.

32 Claims, 18 Drawing Sheets

AIRBORNE BROADBAND COMMUNICATION NETWORK

This application claims the benefit of U.S. provisional application No. 60/028,714, filed Oct. 17, 1996.

FIELD OF THE INVENTION

This invention relates to methods and apparatus for communicating broadband signals between multiple customers and, more particularly, methods and apparatus for communicating using a low-cost, easily maintainable, fast deployable communication system capable of broadband and network communication in various environments.

BACKGROUND OF THE INVENTION

Wireless data and telephony communication systems are quickly replacing conventional communication systems. Conventional terrestrial wireless telephony relies on unobstructed Line-Of-Sight (LOS) paths or close range multi-paths between the sending and receiving stations. This technology is easy to maintain. However, the communication range of operation is limited. The LOS restriction is particularly important for special mobile units, such as off-road vehicles. The local terrain quite often dictates vehicle position relative to the sending and receiving units in order for unobstructed communication to occur. Also, land-based wireless infrastructures are expensive to deploy and maintain, especially in remote areas.

Present wireless communication systems fail to provide broadband wireless communication in real time across extended distances while maintaining a LOS path between stations where one or both stations may be in motion. Many regions of the world today have a sparse or no fixed communication infrastructure and lack the resources needed to upgrade their existing equipment to match more developed areas. Wireless communication systems are an effective tool for providing this service. However, present wireless systems fail to meet the needs of specific applications.

A factor impacting traditional wireless communication infrastructures is the huge increase in demand for communicating broadband services consisting of voice, video, and data information. Because of inherent limitations in the transmission media, wireless communication must compensate for noise introduced in the radio path. The following are wireless techniques for compensating for noise: 1) restricting the range; 2) increasing the transmitted signal amplification or power; 3) increasing the received signal amplification; 4) increasing the error correcting efficiency; 5) changing the radio signal modulation or frequency to reduce the impact of noise; or 6) a combination of any or all of these techniques. However, all of these techniques affect the cost and complexity of a wireless system. Moreover, compensating for unreliable wireless paths becomes increasingly difficult as the data rate increases.

Various satellite-based solutions have been proposed to address the above identified issues, but are generally too costly unless applied over continental or larger geographic areas. Low Earth Orbit (LEO) and Medium Earth Orbit (MEO) based systems aspiring to global coverage do so at the expense of operating satellites over the two thirds of the earth covered by water. Additionally, the often huge increase in wireless earth-space-earth path distance between terrestrial stations adversely impacts satellite-based solutions because of the end-to-end transmission delay and increased path loss. Thus, real-time communication is impractical at higher orbital altitudes. This is especially the case with Geosynchronous Earth Orbit (GEO) satellite systems. The following are other drawbacks or implementation difficulties of GEO satellites: 1) the high cost of launching the satellites into the geostationary orbit; 2) long inter-satellite link distances; and 3) high transmit power requirement. Neither satellite-based or fixed land-based systems easily facilitate transient demands for communication in remote areas. Presently, no communication infrastructure exist for allowing economic operation within a relatively confined geographical area for service that may have fluctuating demand and require rapid deployment of the system.

Another concern in a wireless communication infrastructure is effective radio frequency spectrum management. Satellite-based systems must contend with an increasingly crowded available spectrum and complex and expensive international licensing procedures. This is especially the case for LEO and MEO satellite systems that operate worldwide but are constrained to use a single fixed frequency allocation for communications from and to terrestrial stations. Often this forces a system design into nonoptimum frequency bands which can seriously impact the cost of the system.

The LEO and MEO satellite communication systems attempt to mitigate the GEO disadvantages. However, LEO/MEO satellite networks require a significantly greater number of satellites to provide global coverage. As an example, the IRIDIUM® LEO satellite network proposed by Motorola Inc. and ODYSSEY® MEO satellite network proposed by TRW are targeted to become worldwide, satellite-based, cellular systems primarily intended to provide commercial low-density, narrowband mobile service via portable user units. Similar LEO and MEO satellite networks are being proposed, but they too focus primarily on providing narrowband communication to cellular users. Recently, several "Big LEO" satellite systems are targeting toward providing broadband service primarily to stationary terminals. Teledesic® (Teledesic Corp.) is one such system that proposes to orbit an LEO communications system consisting of 840 satellites featuring fixed-earth cells and fast-packet switching onboard each inter-networked satellite. A major challenge to this type of approach is the enormous cost of placing the satellites in orbit prior to developing the subscriber base for recovering the initial investment or validating the network operating costs.

Accordingly, there is a need for a low-cost, easily maintainable, fast deployable communication system capable of broadband and network communication in various environments. The present invention is directed to providing such a communication system.

SUMMARY OF THE INVENTION

The present invention provides a communication system for wireless broadband communication between a plurality of users. The system includes at least one airborne vehicle for transmitting and receiving communication data within a predefined coverage area. The airborne vehicle further includes an attitude determining mechanism for generating attitude reference information and a position determining mechanism for generating position information of the airborne vehicle relative to each of the users. The airborne vehicle also includes a central processing unit for generating targeting signals according to the generated attitude reference information and position information and an assignor for assigning at least one transmit and at least one receive data channel of a predefined transmission scheme to each user, wherein data channel transmission and reception occur at different time intervals according to a predefined timing protocol. The airborne vehicle further includes a receive directed beam antenna for receiving data according to the generated targeting signals, a switching device for routing data from and to source and destination users and a transmit directed beam antenna for transmitting the received data to the determined destination at the assigned transmit data channel according to the generated targeting signals. Each of the users has an attitude determining mechanism for generating attitude reference information, a position determining mechanism for generating position information, a central processing unit for generating targeting signals according to the generated attitude reference information and position information, and transmit and receive antennas for receiving and transmitting data according to the generated targeting signals and the predefined transmission scheme.

In accordance with other aspects of this invention, the system further includes a plurality of airborne vehicles servicing users within geographically distinct coverage areas. Each airborne vehicle further includes one or more network antennas for exchange of data with other airborne vehicles according to the generated attitude reference information and position information. If the switching device determines the destination user of received data is serviced by another airborne vehicle, the network antenna transmits the received data to the other airborne vehicle which determines the user's destination of the data and transmits the data to the user in its coverage area.

In accordance with further aspects of this invention, the system further includes an operations controller with a communication link to at least one airborne vehicle for supplying operations controlling information to the airborne vehicles.

In accordance with still further aspects of this invention, the operations controller further includes one or more links to public or private data networks for generating communication links between users serviced by the airborne vehicles and stations connected to the external data networks.

In accordance with yet further aspects of this invention, the transmit and receive directed beam antennas are phased array antennas. Also, the phased array antennas include a double buffered shift register for each phased array element, wherein the double buffered shift register prestores targeting signals according to assigned data channels in the transmission scheme.

In accordance with still other aspects of this invention, the transmission scheme is a combination of time and space division multiple access (TDMA/SDMA).

In accordance with other yet aspects of this invention, the airborne vehicles can be unmanned or manned.

As will be readily appreciated from the foregoing summary, the invention provides a new and improved method and apparatus for broadband communication between an aggregate of mobile units through dynamically controlled airborne vehicles. Because of the above-mentioned advantages of the plurality of airborne vehicles for providing broadband wireless communication to mobile units, disadvantages of satellite systems are avoided.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As will be better understood from the following description, the present invention is directed to an airborne communication system for providing broadband, multi-user communication within a network. Broadband communication provides efficient communication of voice, video and data.

Figure 1:
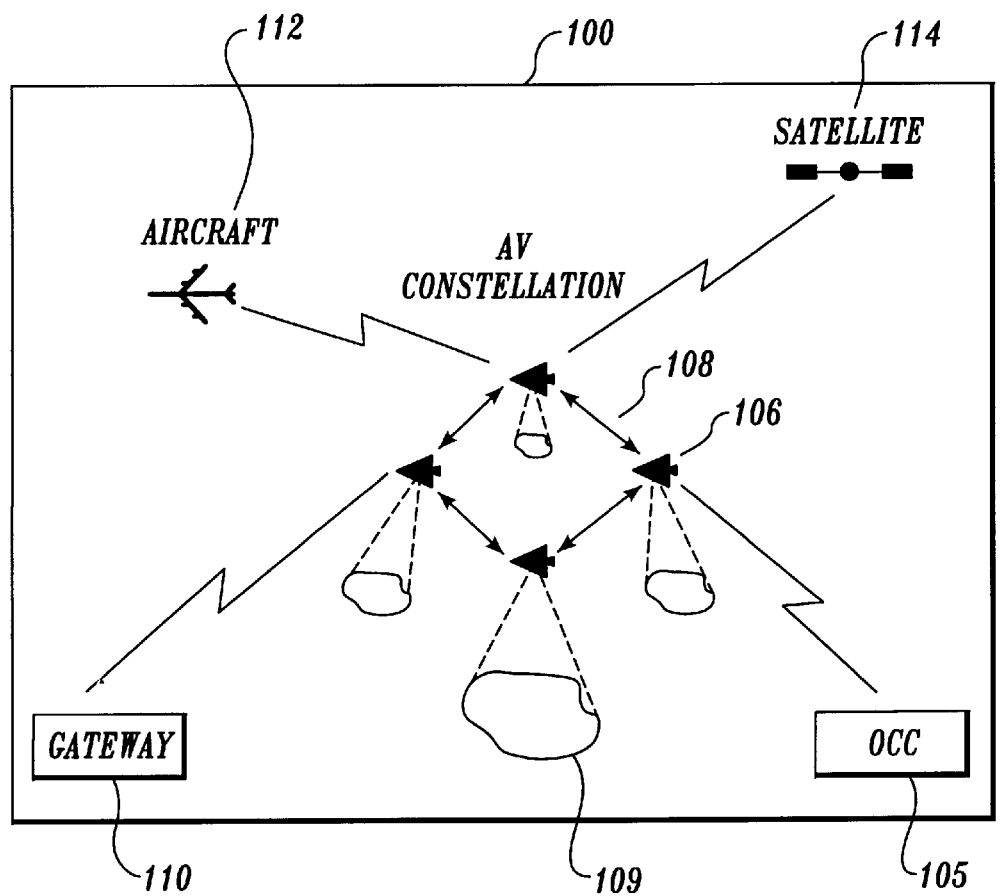
FIG. 1 is a schematic diagram illustrating various components of and connectable to the airborne broadband communication network of the present invention.
Figure 2:
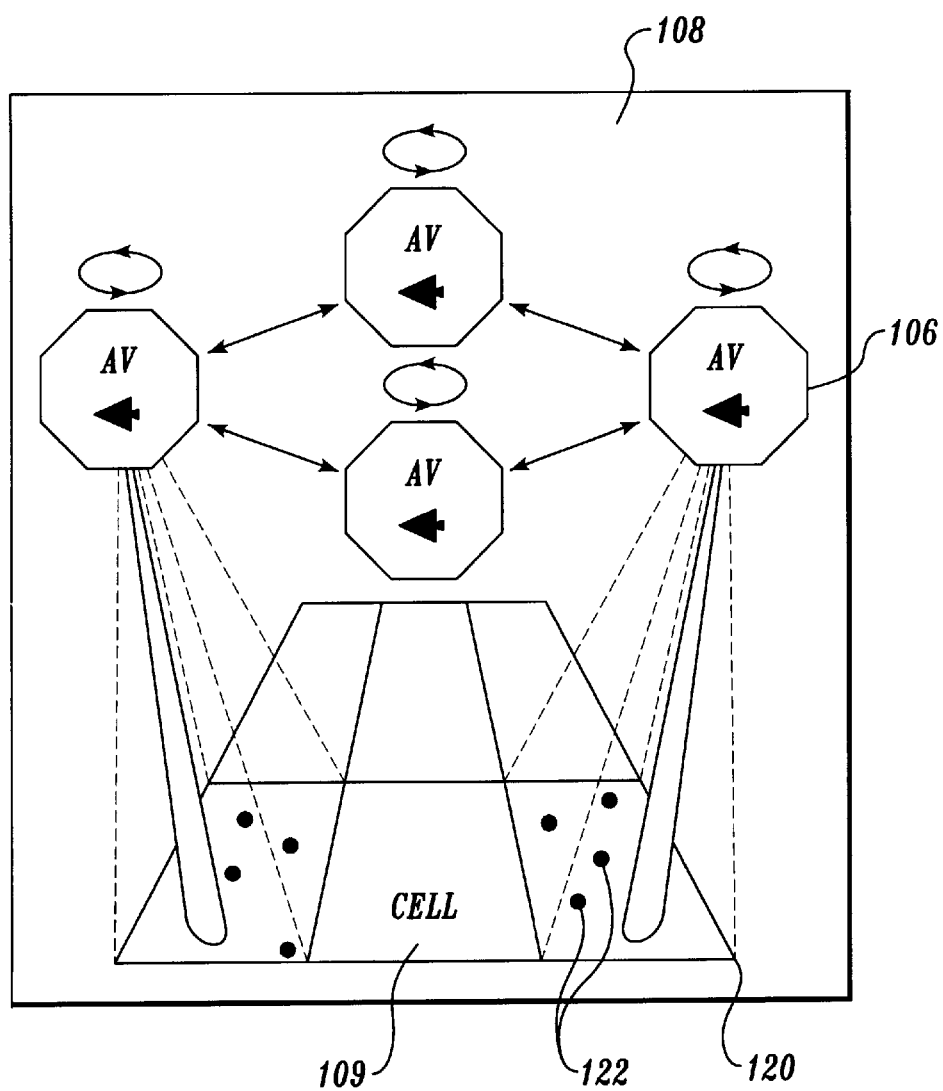
FIG. 2 is a schematic diagram illustrating the primary components illustrated in FIG. 1.

With reference to FIG. 1, a system 100 in accordance with the invention uses a deployed group of airborne vehicles (AV) 106 to provide relay broadband communication service among mobile or nonmobile units in coverage areas or cells 109, and airborne stations such as aircraft 112, satellites 114 or other AVs 106,. Each AV 106 wirelessly links to one or more neighboring AVs forming an airborne inter-networked mesh ("constellation") 108 for routing communication traffic between mobile or nonmobile customers, stations or units. The constellation 108 includes one or more AVs 106 that maintain a high capacity point-to-point satellite or terrestrial base station link for communication connectivity outside the constellation's aggregate coverage area 120, as represented in FIG. 2. The AVs 106 may be manned or unmanned aircraft. Unmanned AVs are preferred because of their relatively low operating costs and extended on station time. For clarity, however, the airborne relay vehicles will be referred to as AVs. The present invention provides a fast and effective communication platform with minimal maintenance and low operating cost in remote and dense population areas. The following description describes in detail the system including the AV components and the communication control between components.

AV Coverage Domain—AV fixed cells

Figure 3:
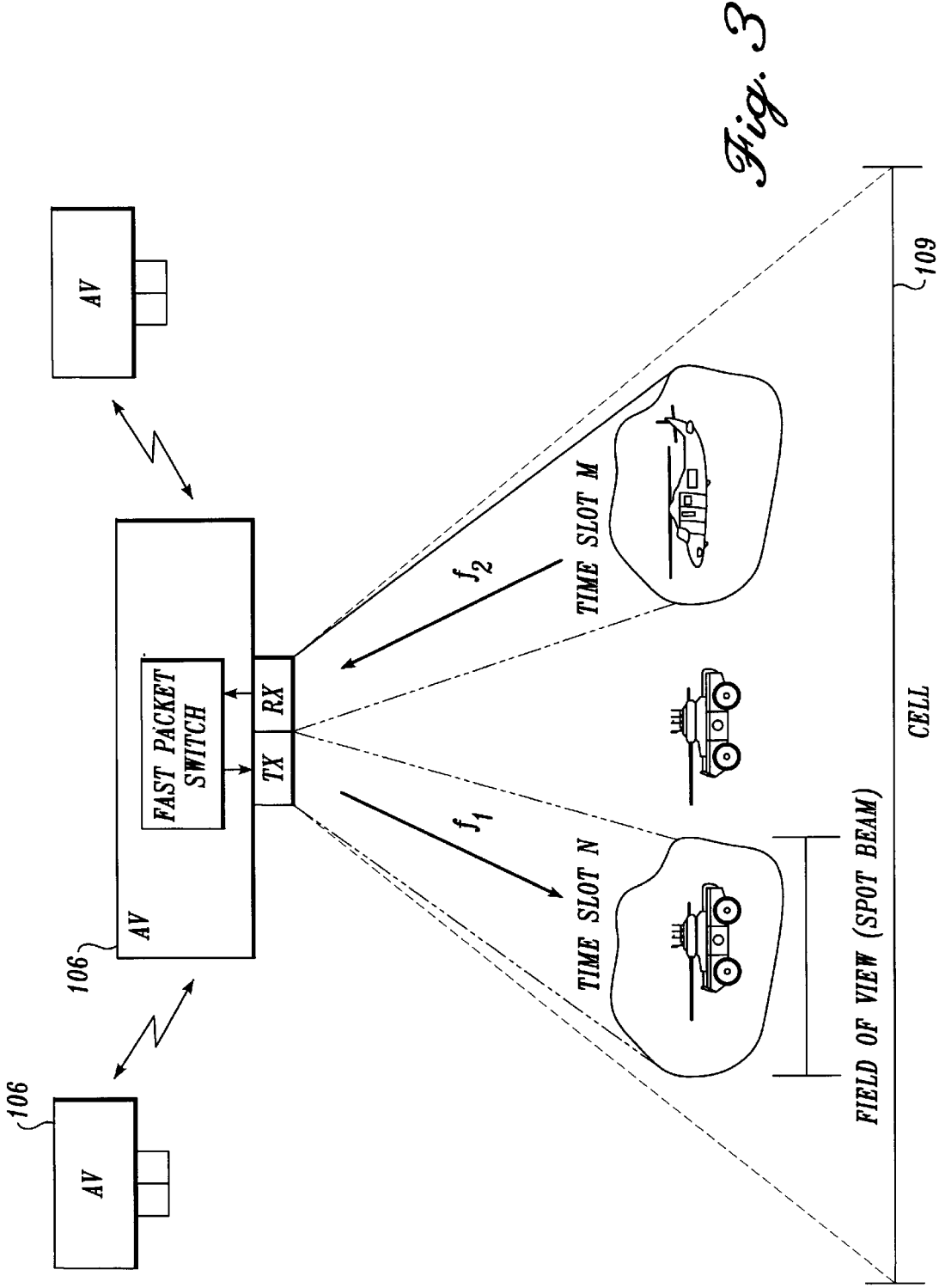
FIG. 3 is a schematic diagram further illustrating the components of FIG. 2 applied in a specific environment.

Referring to FIGS. 1 and 2, the AVs 106 preferably fly above weather or commercial transport traffic while providing line-of-sight (LOS) radio paths to mobile units 122 (FIG. 2) or stationary terrestrial stations, such as an Operations Control Center (OCC) 105 (FIG. 1) or a gateway station 110 over a wide geographic coverage area 120 (FIG. 2). As shown in FIG. 3, the mobile units 122 may be tanks, helicopters, other military units, or units for commercial applications such as medical relief units or mobile cellular users. Initially, each AV 106 climbs to operating altitude and remains on station until a replacement arrives, whereupon it will transfer communication responsibilities to the replacement and descends for refueling and routine maintenance. Unmanned AVs 106 may remain on station for a period as long as one or more days at altitudes of about 60,000 feet. In the preferred embodiment, an AV 106 remains over a fixed geographical area (hereinafter cell) 109 and services that cell while flying at constant altitude along a fixed closed path. This does not preclude AV movement to handle the situation when the aggregate of mobile customers is moving in a common direction. The cell 109 of a single AV 106 is therefore typically earth fixed, but could also relocate in any direction as directed by the OCC 105. Cell size and AV coverage capabilities are described in more detail below with respect to FIG. 8. Also, the entire constellation 108 could be commanded to shift position at different times to prevent interference, such as interference from the sun, for example.

AV Wireless Links

The wireless links maintained by the AVs fall into two classes: (1) point-to-point continuous or "staring" radio frequency (RF) beams, hereinafter staring beams; and (2) intermittent or "hopping" RF beams, hereinafter hopping beams. The staring beams are used for high capacity wireless links that are maintained for a relatively long time, e.g., inter-AV links, AV to OCC links, AV to gateway links or AV to satellite links. Because of the mobile nature of the AVs 106, "staring" does not imply that the beam is stationary with respect to the local reference frame of the AV 106 and in fact must be continually steered to maintain a given link. The hopping beams are used for accessing a group of mobile units within the cell 109 serviced by a particular AV 106 using a single high-gain RF beam. Staring and hopping beams are described in more detail below. AVs transmit and receive data using staring beams formed by wideband or directed beam antennas, such as a phased array antenna (PAA). A PAA used for hopping beams provides a broadband data link with high speed targeting of mobile units. PAA operation is described in more detail below with respect to FIGS. 4–6.

Figure 4:
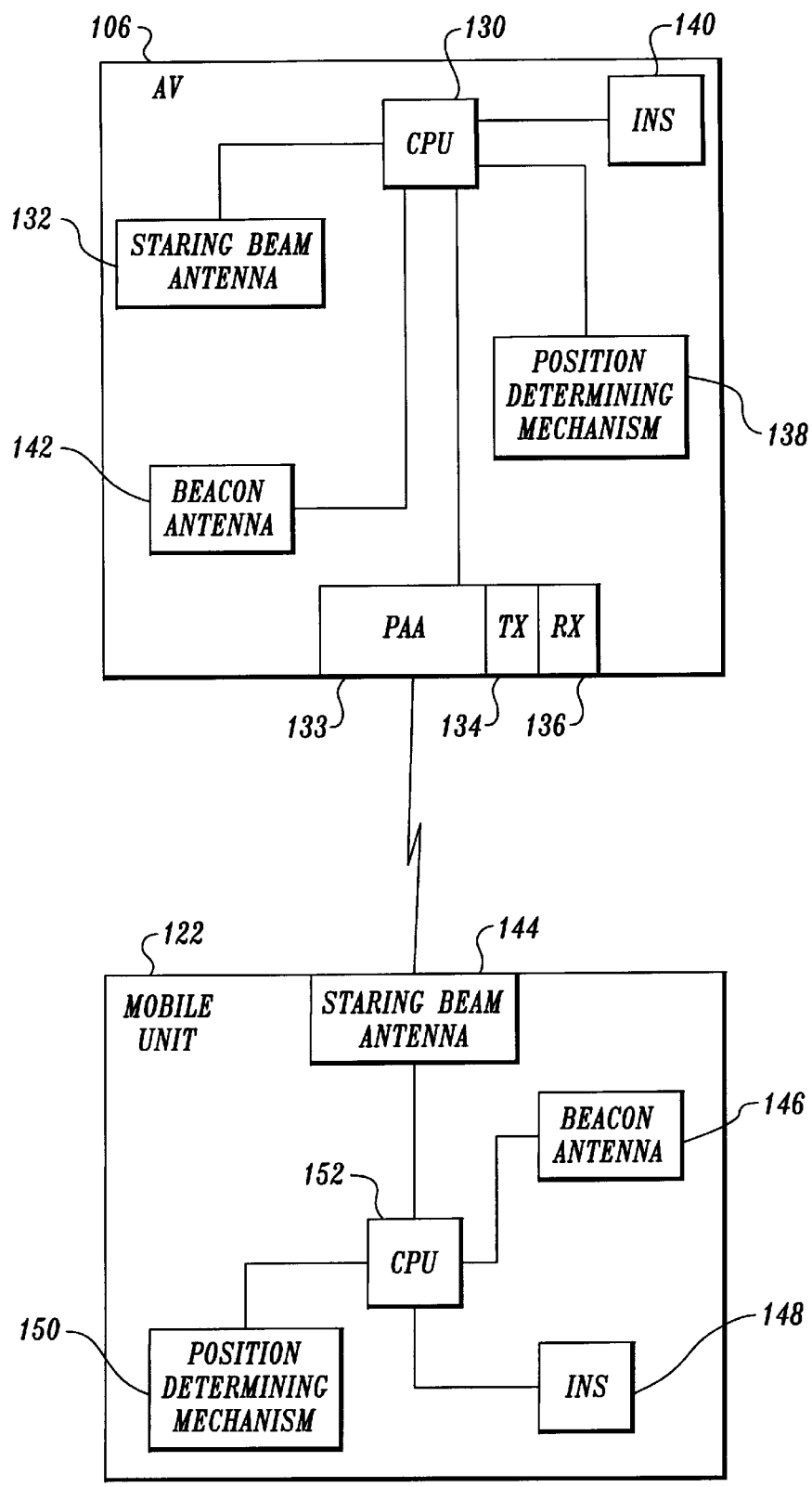
FIG. 4 is a block diagram illustrating the internal components of the most basic communicating components of the present invention.

As shown in FIG. 4, AVs 106 can include a staring beam antenna 132, transmit (TX) and receive (RX) directed beam antennas 134 and 136 for hopping beam communication, a position determining mechanism 138, an attitude determining mechanism 140 and a central processing unit (CPU) 130 coupled to the AV's components. The AV 106 may also include a beacon antenna 142 coupled to the CPU 130. The position determining mechanism 138 generates geographical referenced position information including altitude. The position determining mechanism 138 includes a receiver for receiving position information from a satellite based global positioning system (GPS) and generates AV altitude, position and ground speed information according to the received position information. The attitude determining mechanism 140 provides attitude reference information for the AV 106. The CPU 130 processes the information generated by the attitude determining mechanism 140 and position determining mechanism 138 and generates steering control signals for the dedicated staring and hopping beam antennas.

The staring beam antenna 132 may be an optical beam or an RF beam antenna. A free space optical beam antenna uses lasers to provide communication similar to broadband fiber-optic terrestrial telecommunication. Since the AVs preferably operate at altitudes above the weather, attenuation of the inter-AV or AV/satellite optical and RF beams are dramatically improved, thereby facilitating wavelengths that would be impractical at lower altitudes. Steering of optical beam antennas is accomplished via electrically steered mirrors to deflect the optical beams. RF beam antennas can be either mechanically steerable antennas or electronically steered directed beam antennas, such as PAAs. Transmitting staring beam antennas are slaved to the beam pointing direction of the receiving staring beam antenna for full duplex links. The AV's transmit and receive staring beam antennas may point at the same target, thus providing a platform for two-way communications. In order that an inter-AV beam from one pair of AVs not interfere with another's, the RF beams are isolated by a multiple access communication protocol, such as coded division multiple access (CDMA) or frequency division multiple access (FDMA) technique, unique to an AV.

In order that the receive and transmit staring beam antennas' boresights are initially directed toward the intended target, the target location must be determined. Examples of targets for the AV staring beams are a neighboring AV in the case of inter-AV crosslinks, a ground gateway station 110, a satellite 114, or an airborne command aircraft 112 (FIG. 1). There are two possible methods for obtaining target position information. In the first method the AVs are launched with the target position information for establishing the links once the AV is on station. Implicit in this method is that the antenna beams are angularly broad enough to establish the link with the target even if the target is slightly off the position known to the targeting AV. Once the links are established, the connectivity is managed by the OCC 105 and could be dynamically altered to adjust for call traffic patterns or equipment failure. An OCC 105 link to one or more selected AVs 106 provides OCC generated position and other control information to the AV mesh or constellation 108.

The second method for providing initial beam steering information is a satellite link between the OCC 105 and the AV mesh 108. The AV is launched with the stored location of the satellite 114 providing the OCC link. Once on station the AV reports back to the OCC through the satellite and receives the target position information for establishing any staring beam links. A common shared control channel, such as Aloha or similar Carrier-Sense Multiple Access protocol channel, allows the AVs to coordinate beam steering by transmitting position information back to the OCC.

Once the staring beams are properly pointed, AVs must maintain staring beam tracking and optimize antenna beam pointing for optimum signal quality. Two methods maintain the tracking, active and passive target tracking. In active target tracking, target position information, determined by the position determining mechanism, is sent by the target using the staring beam link to the AV, thereby maintaining the link. When the AV receives the position information of the intended target, the AV calculates the vector for pointing the receive and transmit antenna pair assigned to that target.

Passive target tracking performs rapid sequential search of the receive antenna beam about the last known position of the target in order to maintain the target in the antenna boresight. Again, the transmit antenna boresight is slaved to the receive antenna, since the target is common for both. This standard tracking technique allows the AV and the target to maneuver while maintaining the staring beams on target. Preferred passive target tracking techniques usable with the directed beam antenna are described in more detail below with respect to FIGS. 10 and 11

Figure 5:
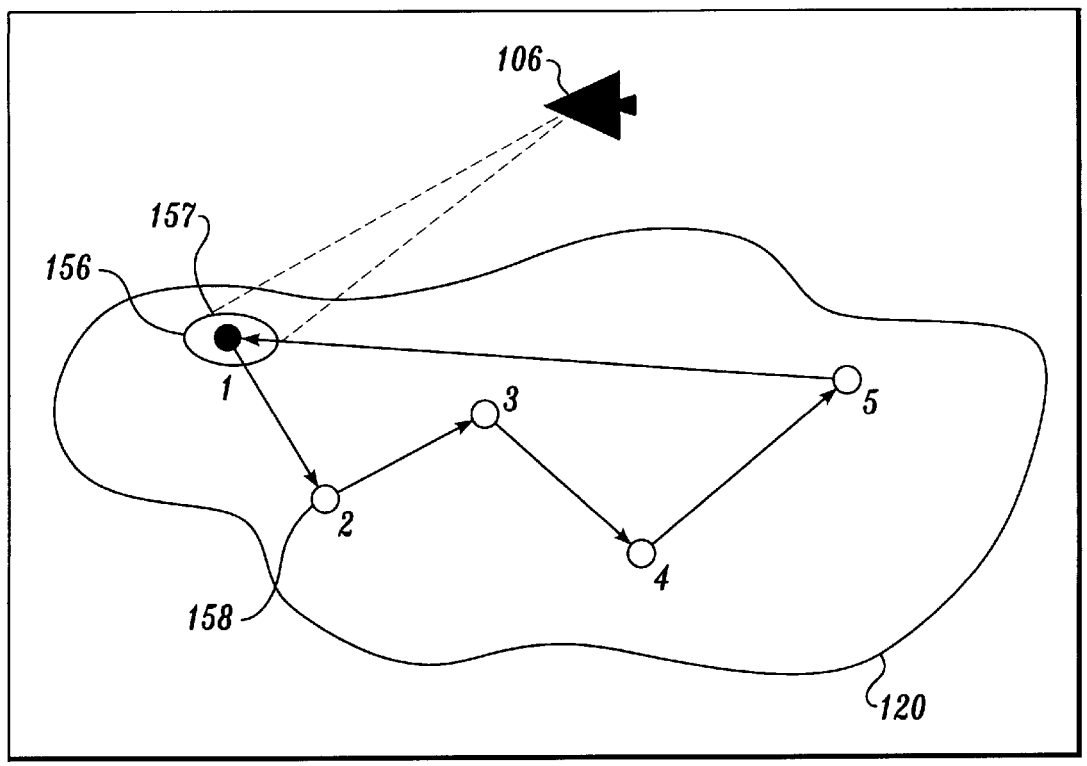
FIG. 5 is a schematic diagram illustrating communication targeting operation of the present invention.

Optical or RF beam antennas can also provide hopping beam communication. RF beams are preferable because of the complexity of optical beam steering at lower altitudes. In a preferred embodiment, RF beams are generated by high-gain electronically steerable PAAs. For example as shown in FIG. 5, a narrowly confined RF beam or spot beam 156 is steered toward a predefined target 157, dwells on that target for a predefined brief period of time, and then is rapidly steered (hopped) to the next predefined target 158. A target is a mobile unit requiring communication with the AV 106 servicing the cell 120 the mobile unit is in. The hopping beam PAAs provide high data rate transmission, low co-channel interference, and better security because a PAA's spot beam 156 can be directed at a specific target. Also, PAAs require relatively low power. The following is a description of the AV's PAAs used by the AVs for hopping beam communication.

Figure 6:
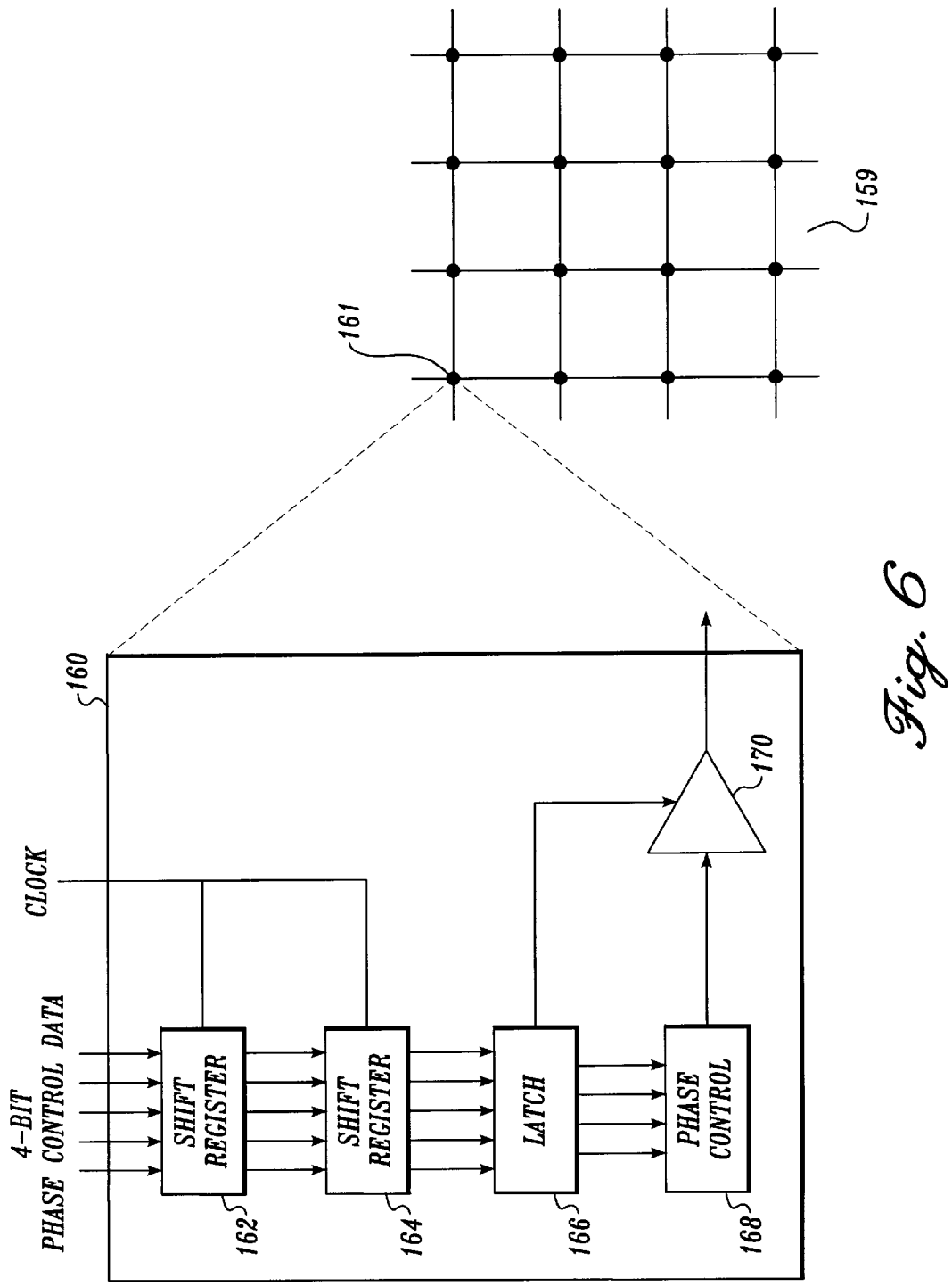
FIG. 6 is a block diagram further illustrating the components of a phased-array antenna system operable with the present invention.

With reference to FIG. 4, transmit and receive PAAs 134 and 136 are mounted on each AV 106 for providing hopping beam communication with mobile units 122. The PAAs provide dedicated high data rate links for data transmission and are electronically steered by a phase controller for mobile unit targeting. As shown in FIG. 6, each PAA includes an array 159 of elements 161 whereby each element includes a module 160. Each module 160 includes a double-buffered shift register 162, a latch 166, a phase controller 168 and a gate 170. The first buffer of the double buffer shift register 162 receives serially the steering (phase) control information (data) for targeting a first mobile unit from the CPU 130 according to a clock signal from an AV system clock or a CPU clock. Shift registers for all modules in a particular row are clocked in simultaneously. While the PAA is targeting the first mobile unit the steering control information for the next mobile unit is loaded into the second buffer of the double buffered shift register 162. The phase control data includes a four-bit phase word that indicates the phase differential angle for the particular element and one bit that indicates the polarization of the beam. A low speed 3 Mhz clock takes approximately 25 $\mu$sec to serially update shift registers for a 256 element (16 by 16) PAA.

The time required to move the RF beam is constrained mainly by the time it takes to serially load shift registers in the modules of the elements of the PAA. This can be accomplished on the order of $10^{-5}$ seconds for arrays comprised of less than a few thousand elements. Then, once the shift registers are loaded, the actual process of reforming the beam at the new location proceeds in a matter of $10^{-7}$ seconds or less. Therefore the time taken to hop the beam between mobile units is limited by the load time for the shift registers. However, since the data protocol scheme, preferably time division multiple access (TDMA), dwells on a particular location between hops in a cyclic fashion, double buffering of the shift registers provides enough set-up for the next hop phase during the dwell time for the previous hop location. Thus, the overhead of hopping the beam is substantially reduced which allows an increase in the number of mobile units served. Rapidly steering the antenna boresight over wide angles is not practical using conventional high-gain dish, horn antennas, or any mechanically steered antennas, because mechanical servos can not perform at the speeds described above.

Addressing the mobile units is random as opposed to other more limited techniques, such as raster scanning. This does not preclude the possibility of addressing the mobile units in a regular order, but the preferred embodiment allows arbitrary temporal and spatial terminal access. Mobile unit random scanning maximizes the hopping beam bandwidth efficiency because the beam never dwells at a location without a mobile unit.

Figure 7:
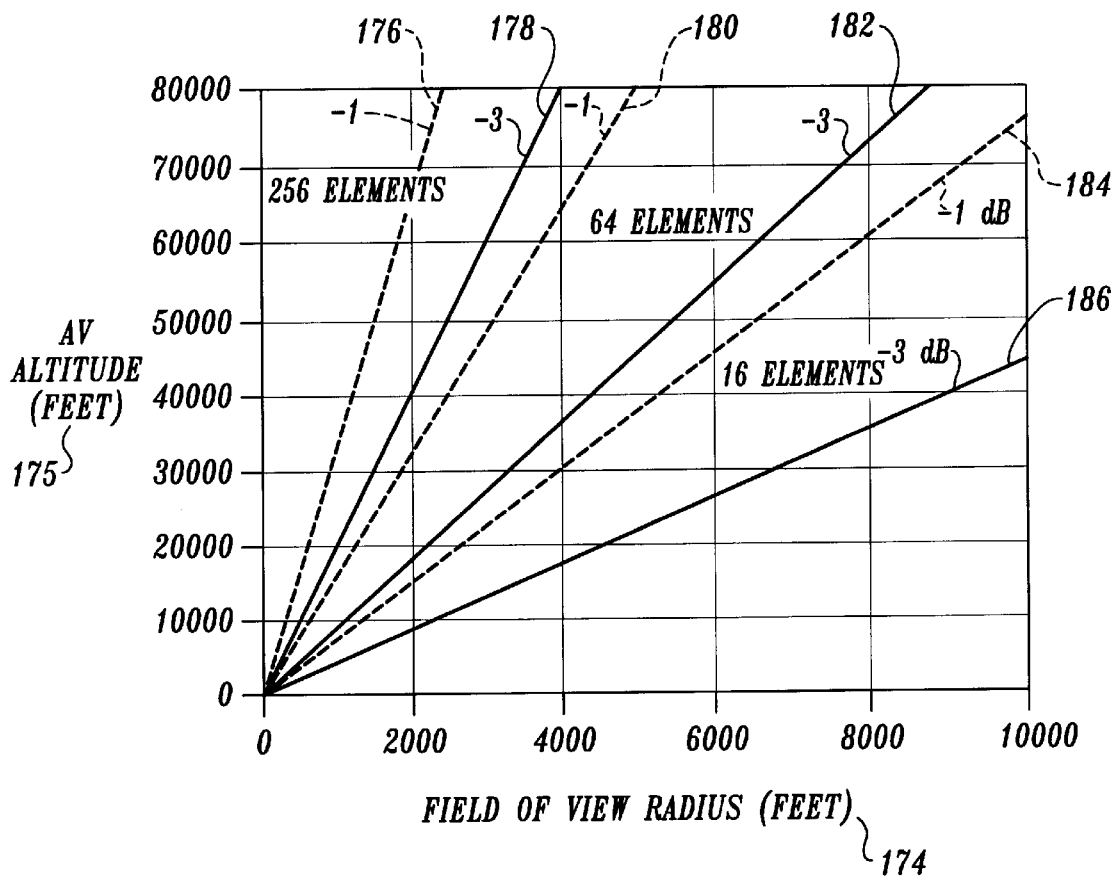
FIGS. 7 and 8 are graphs illustrating antenna coverage areas versus altitude.

FIG. 7 is a graph illustrating PAA spot beam or field of view radius in feet (horizontal axis 174) as determined by PAA altitude in feet (vertical axis 175) and the number of elements in the PAA. Lines 178, 182 and 186 represent the field of view radius of a −3 dB degrade arc and lines 176, 180 and 184 represent the field of view radius of a −1 dB degrade arc according to a 256 element, 64 element and 16 element PAA, respectively. The distance between a −1 dB and a −3 dB degrade arc of the field of view directly depends upon the number of elements in the PAA. It is well known that a PAA with just a few elements has a greater field of view cone angle than a PAA with many elements. More elements focus the antenna beam. For example, a 256 element PAA at an altitude of 60,000 ft. exhibits a −1 dB arc radius equal to about 1,800 ft. and a −3 dB arc radius equal to about 3,000 ft. Therefore, a mobile unit traveling at 100 ft/sec on an outbound course on a radial line of a spot beam has a distance of 1,200 ft. between the −1 dB and −3 dB arc in order to find a new AV or update its position information on to its current AV before reaching the outer limit, −3 dB, arc. 1,200 ft. equates to 12 sec. for the mobile unit traveling at 100 ft/sec. With a 64 element PAA the distance between the degrade arcs becomes about 2,800 ft. at 60,000 ft. The −1 dB and −3 dB arcs are the lower and upper limit for the mobile unit to perform position updates or hand-off between AVs, respectively.

Figure 8:
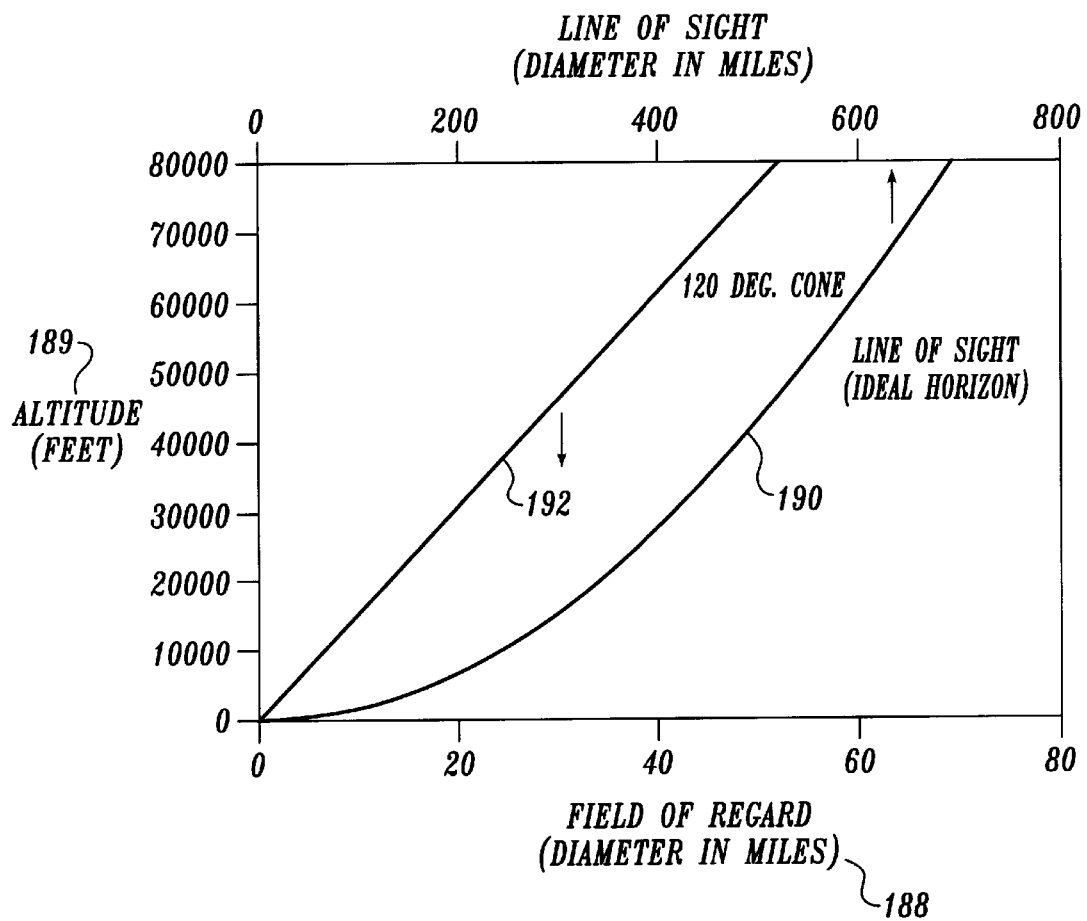

FIG. 8, illustrates PAA cell size or field of regard diameter in miles (horizontal axis 188) as determined by PAA altitude (vertical axis 189) and predefined angular range of a look-down cone from the PAA. Line of sight line 190 represents the field of regard of a PAA with an angular range that covers the horizon, the look-down angle of a PAA's field of regard is typically 120°. A 120° look-down cone angle is preferable because of the antenna gain loss at higher scan angles. The field of regard corresponds to the cell 109 (FIG. 2). The field of regard of an AV's PAA is dependent upon AV altitude and look-down angle. For example, if the field of regard is 20 and 40 miles, the AV altitudes are 30,000 and 60,000 ft., respectively, with a 120° look-down cone.

Figure 9:
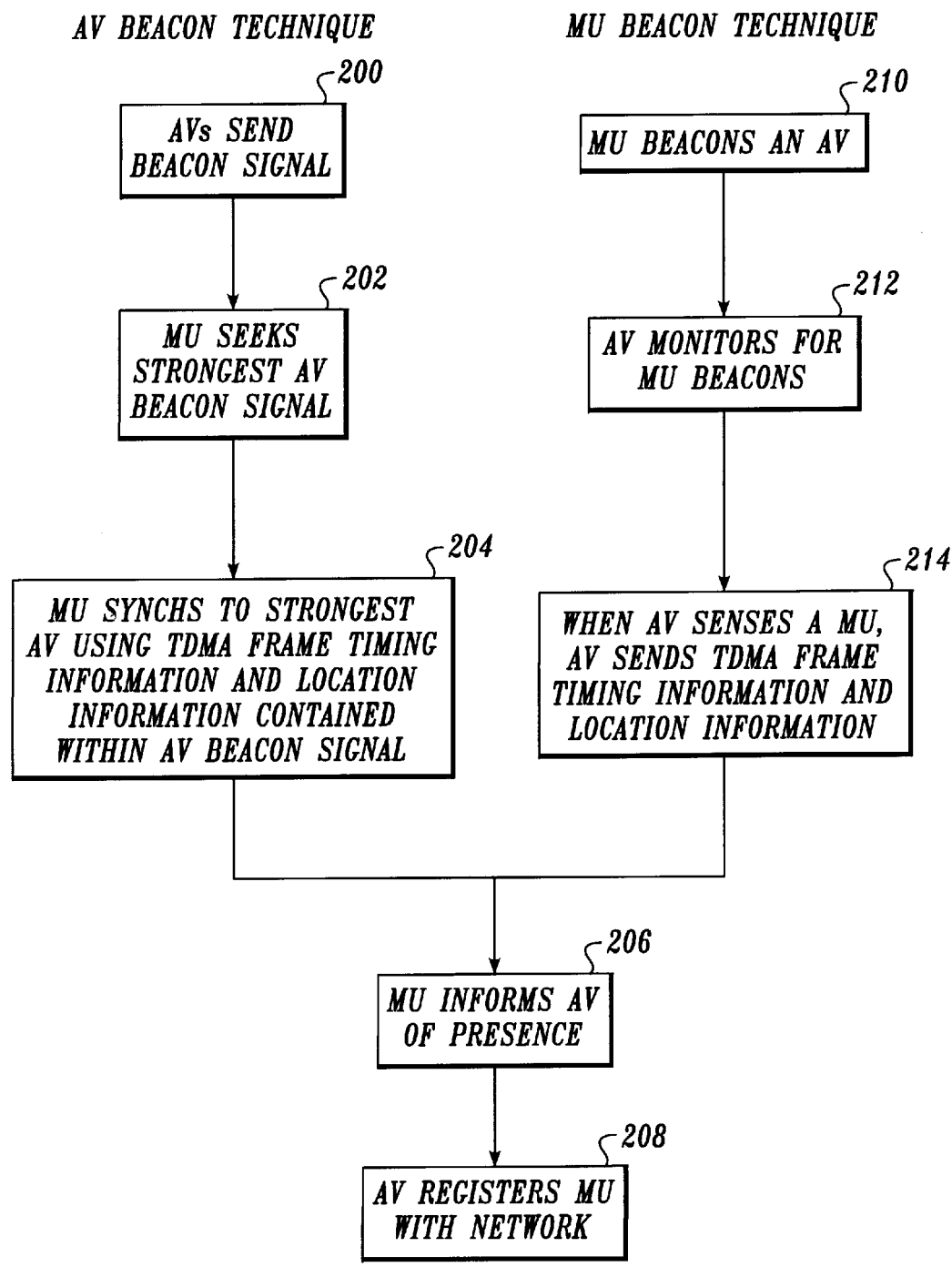
FIG. 9 is a flow diagram of various methods for establishing communication between mobile units and airborne vehicles according to the present invention.

In order for a communication link to be established between an AV 106 and a mobile unit 122, the AV 106 must first determine the location of the mobile unit 122 and then track its movement as well as compensate for the motion of the AV itself. As with the staring beams, AV motion compensation is facilitated by CPU processing of the attitude information generated by the attitude determining imechanism 140. Acquisition of the mobile unit's location is accomplished by an omni-directional out-of-band order wire channel using one of two possible techniques. The omni-directional out-of-band order wire channel is an all direction, low data rate, secure channel. In the first technique (AV beacon), represented in FIG. 9, the AV periodically solicits new mobile units for registration with the AV, at block 200. Using this method a mobile unit wishing to communicate performs a LOS hemispherical search seeking the strongest AV beacon signal, at block 202. Information encoded in the beacon signal contains a periodic TDMA start-of-frame marker and AV position information, so that the mobile unit can synchronize to the TDMA frame, at block 204. After determining LOS distance, the mobile unit adjusts its transmission clock skew for proper propagation delay. The mobile unit compares the AV's position with its own position to determine the LOS distance between them. Upon finding an AV the mobile unit directs both its receive and transmit antenna beam boresights toward the AV and informs the AV (and thereby the network) of its presence using the omni-directional out-of-band order wire channel, which is guarded by the AV, at block 206. The AV then registers the mobile unit with an attached network, at block 208. Network registration is described in more detail below with respect to FIG. 17. An omni-directional or beacon antenna 142 or the PAA 133 may generate the omni-directional out-of-band order wire channel.

In the second technique (mobile beacon) the mobile unit beacons an AV 106 for registration with the network using the omni-directional out-of-band order wire channel, at block 210. The AV 106 monitors the order wire channel with the omni-directional or beacon antenna 142 or PAA 133, at block 212. Upon sensing a mobile unit beacon the AV responds on the same omni-directional channel with position information and TDMA frame timing information, at block 214, after which the sequence follows blocks 206 and 208 of the first technique.

Figure 10:
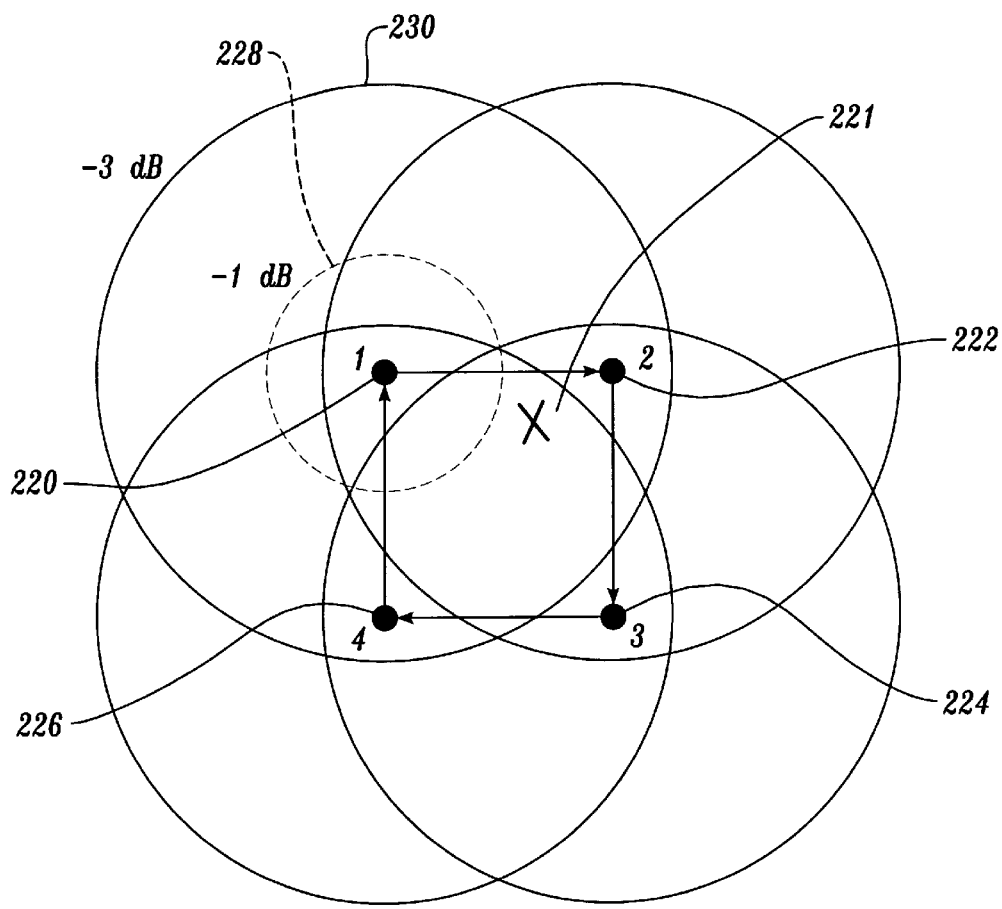
FIGS. 10 and 11 are spot beam antenna coverage diagrams illustrating methods according to the present invention for maintaining communication.
Figure 11:
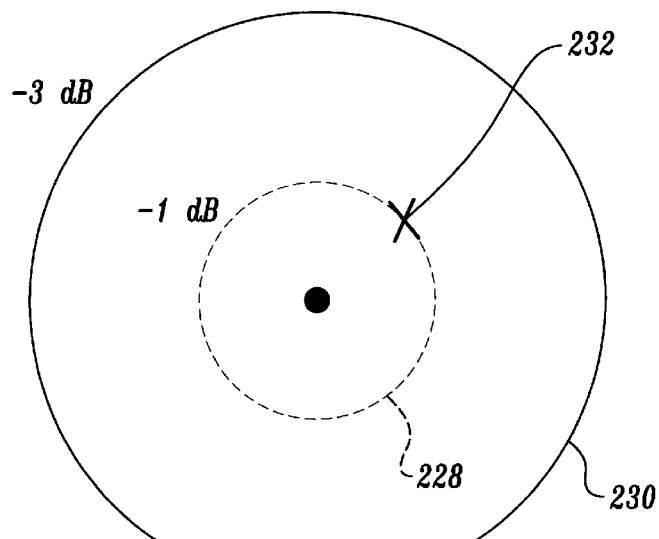

Tracking of a mobile unit 122 by the AV 106 begins after the mobile unit 122 has initially registered its position with the AV and it is being regularly addressed by the AV hopping beams. As with the staring beams, tracking of the mobile unit by hopping beams can be active or passive as described above. As shown in FIG. 10, passive tracking is accomplished by sequentially stepping the AV receive spot beam around the mobile unit's true position each time it is addressed in the TDMA cycle. The AV determines approximate mobile unit position by analyzing mobile unit signal strength after each receive spot beam step. Signal strength is determined relative to the −1 dB and −3 dB degrade arcs of the spot beam. If a mobile unit's actual position is at position 221, position 1 220 indicates the mobile unit is outside its −1 dB arc and within its −3 dB arc, position 2 222 indicates the mobile unit is within its −1 dB arc, and positions 3 224 and 4 226 appear to indicate the same as position 1 220. Therefore, the system can determine approximately where the mobile unit is located and can adjust accordingly.

Active tracking depends on the mobile unit communicating its location to the AV whenever its position changes enough to degrade the communication link by a preselected amount. For example, a shown in FIG. 11, if a mobile unit detects a −1 dB degrade in reception strength, as indicated by its location 232 on the −1 dB degree arc 228, the mobile unit communicates its location to its AV.

Mobile Unit Wireless Links

As shown in FIG. 4, the mobile unit includes at least one staring beam antenna 144, a CPU 152, an attitude determining mechanism 148, and a position determining mechanism 150. Position determining mechanism 150, attitude determining mechanism 148, CPU 152, and staring beam antenna 144 operation is similar to that performed in the AV. The mobile unit 122 may also include a beacon antenna 146.

The mobile units 122 maintain only staring beams which are further subdivided into omni-directional and high-gain directed beams. The high-gain directed beams are for in-band broadband call traffic over the LOS wireless link between the mobile unit 122 and the serving AV 106. The omni-directional link is used for mobile beaconing.

Once the mobile unit has acquired the location of the AV, described above with FIG. 9, the boresights of its staring beam antenna 144 are directed at the AV. Directed beam antennas are preferred in this embodiment. It is understood that the directed antenna beams are angularly broad enough to establish the link with the AV target even if the target is slightly off its last known position. Once the initial beam steering is accomplished there is normally no need to further steer the mobile unit's antenna except as required by the mobile unit's changes in position and attitude. The mobile unit's directed beam antenna is preferably a PAA, which allows accurate and fast adjustments to mobile unit position and attitude changes. Adjustments are accomplished according to the position determining mechanism's determined position information and attitude determining mechanism's determined attitude reference information. Like an AV, a receiver receives position information from a satellite based GPS.

Figure 12:
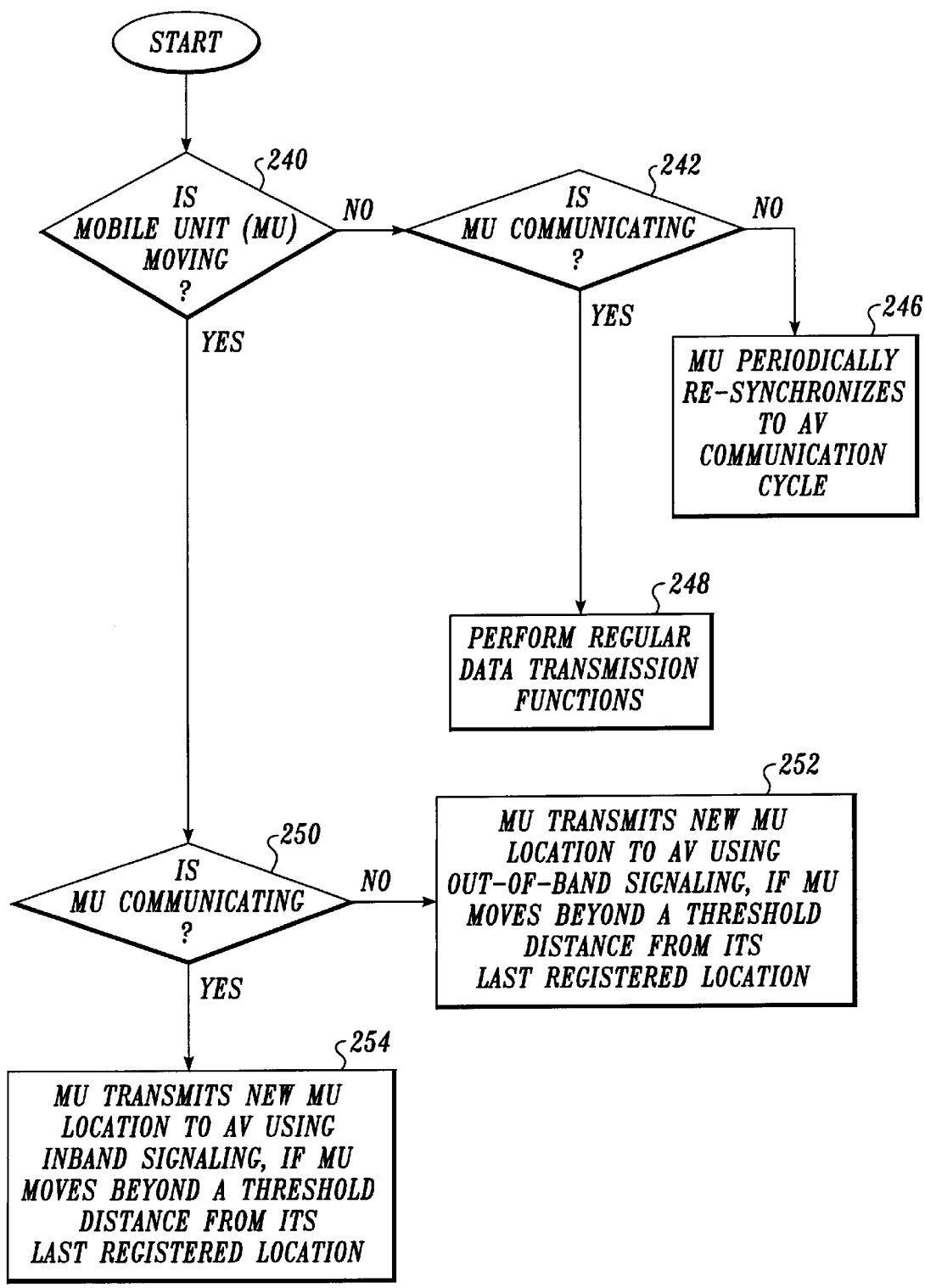
FIG. 12 is a flow diagram illustrating various mobile unit states according to the present invention.

As shown in FIG. 12, each mobile unit exhibits four different communication states. Each state is experienced after the mobile unit has registered with an AV. In the first mobile unit state, the mobile unit is not moving and not communicating, see decision blocks 240 and 242. In the first state at block 246, the mobile unit periodically resynchronizes to the AV's communications cycle using the omni-directional out-of-band order wire channel. The mobile unit communicating but not moving is the second state, see decision blocks 240 and 242. In the second state, the mobile unit performs regular transmission functions over the in-band channels from the directed beam antenna, at block 248. The third state has the mobile unit moving but not communicating, see decision blocks 240 and 250. In the third state, the mobile unit transmits a new location signal to the AV using out-of-band signaling, if the mobile unit moves beyond a first predefined threshold distance from its last registered location, at block 252. The first threshold distance is a function of the power of the received out-of-band signals from the AV and the mobile unit's velocity. The final mobile unit communication state has the mobile unit moving and communicating, see decision blocks 240 and 250. In the final state, the mobile unit transmits a new location signal to the AV using in-band signaling, if the mobile unit moves beyond a second predefined threshold distance from its last registered location, at block 254. The second threshold distance is a function of the power of the received in-band signals from the AV and the mobile unit's velocity.

Frequency Management

Figure 13:
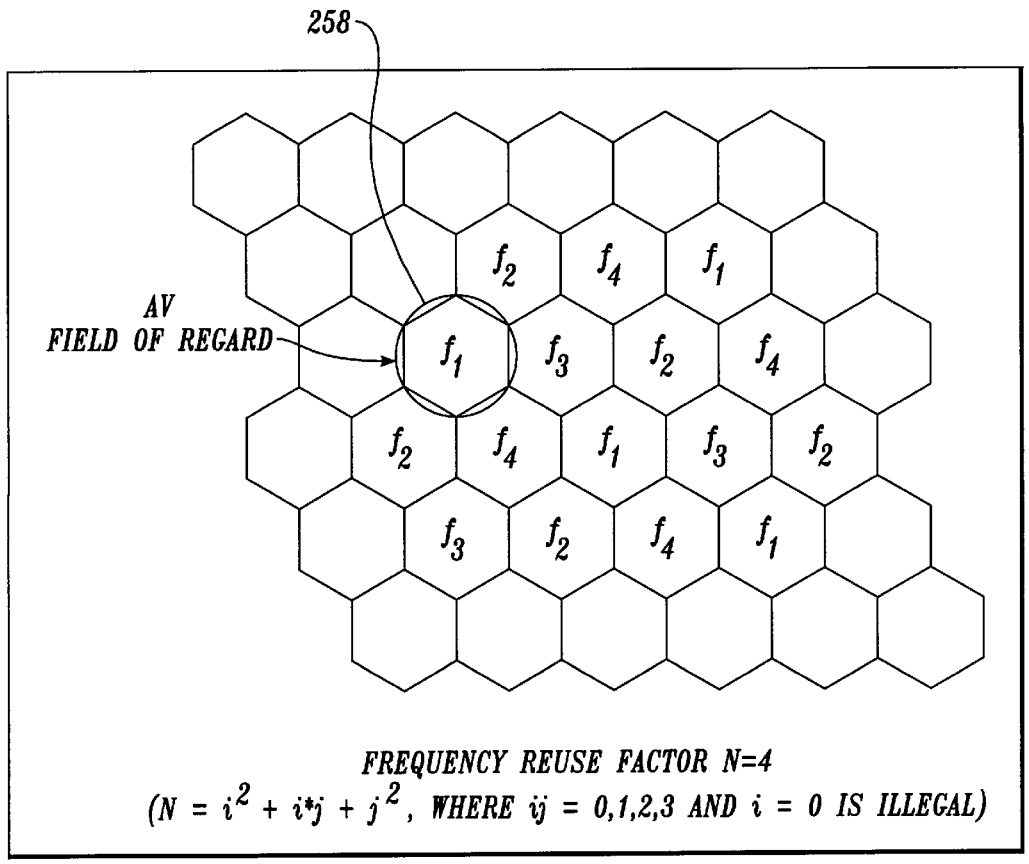
FIG. 13 is a block diagram illustrating an example frequency reuse scheme according to the present invention.

Radio spectrum reuse limits the total spectrum required to operate the group of AVs 106. There are various methods that could be used to achieve frequency reuse such as Frequency Division Multiple Access (FDMA), Code Division Multiple Access (CDMA), Time Division Multiple Access (TDMA), Space Division Multiple Access (SDMA), or a combination of any of these. In all cases, the preferred embodiment relies on reuse of frequencies between the cells 109 of the AVs with the goal of minimizing the required radio spectrum. For example, as shown in FIG. 13, in one embodiment AVs use FDMA to prevent interference between nearby AVs with a 1/N reuse factor between AVs. N is the number of frequencies in use. FIG. 13 shows the case for N=4. The management of the frequency reuse is coordinated by system and environmental requirements as determined by the OCC 105 (FIG. 1).

An example embodiment is given below:

The AV and the mobile units are equipped with a 64 element transmit and receive PAAs. In this example we will assume the use of the military X-band DSCS frequency band (7.25 to 8.4 Ghz) for the wireless links. Uplinks are assigned frequencies between 7.25 and 7.75 Ghz while downlinks are assigned frequencies between 7.9 and 8.4 Ghz. The AV is assumed to be flying at an altitude of 60,000 feet with a coverage area of 120 degree cone under the AV. At the outer edges of the field of regard the mobile unit's transmit and receive PAA antenna would have a minimum scan angle of 30 degrees off the local horizon which is a reasonable compromise between range and elevation angle required to maintain line-of-sight. The PAA with 64 element provides a TDMA scheme with an aggregate bandwidth of 155 Mbps with a $10^{-9}$ bit error rate. Greater aggregate bandwidth can be supported with a larger number of transmit and receive PAA elements. In this example a single AV using TDMA serves a maximum of approximately 100 users with a minimum of 1.5 Mbps per user per channel. Higher bandwidths can be achieved by assigning multiple channels to a user. Conversely, larger number of users but at a lower minimum data rates could also be chosen. Given below is the link budget analysis for the example discussed above.

| Link | Frequency (Ghz) | Transmit PAA EIRP (dbW) | Receive PAA G/T (dB/K) | Margin (dB) |
| --- | --- | --- | --- | --- |
| Uplink | 7.9–8.4 | 24.1 | −9.5 | 5.9 |
| Downlink | 7.25–7.75 | 24.1 | −7.2 | 8.9 |

Note: (1) Aggregate bandwidth of 155 Mbps with a $10^{-9}$ bit error rate; (2) altitude of AV, 60,000 feet; (3) coverage area is 120 degree cone under the AV; (4) transmit and receive PAA are assumed to have minimum scan angle of 30 degrees off the local horizon.

As will be readily appreciated to those of ordinary skill in the data communication field, various modulating schemes may be used to provide the necessary communication through the directed beam antennas of the present invention.
Hopping Beam Multiplexing Scheme A number of multiplexing schemes and their combinations may be used to provide communication services to mobile units within an AV's cell. Communication schemes that may be employed for broadband full-duplex connectivity to mobile units include TDMA, CDMA, and FDMA. These multiple access schemes may be used individually or a combination of one or more may be used depending on desired network capacity. Large antenna gain is required for a high data rate wireless link and maintaining the transmitted power within reasonable limits. Minimizing the transmitted power improves the link security and is essential to reduce RF equipment complexity and satisfy the Power Flux Density and side lobe restrictions imposed by frequency regulations and predefined system operational requirements. The spot beam of the PAA of the AV is relatively narrow in comparison to the field of regard of the PAA. Therefore, the PAA boresight must be steered to the desired location in order to establish a wireless link between the AV and the mobile unit. A directed beam antenna with a narrow field of view is very well suited to the TDMA approach for providing communication services to mobile units within an AV's cell. As mentioned earlier a combination of TDMA and other multiplexing schemes may also be used to enhance the capacity of the system. The hopping beam multiplexing scheme is described using a TDMA approach for example purposes only.

Figure 14:
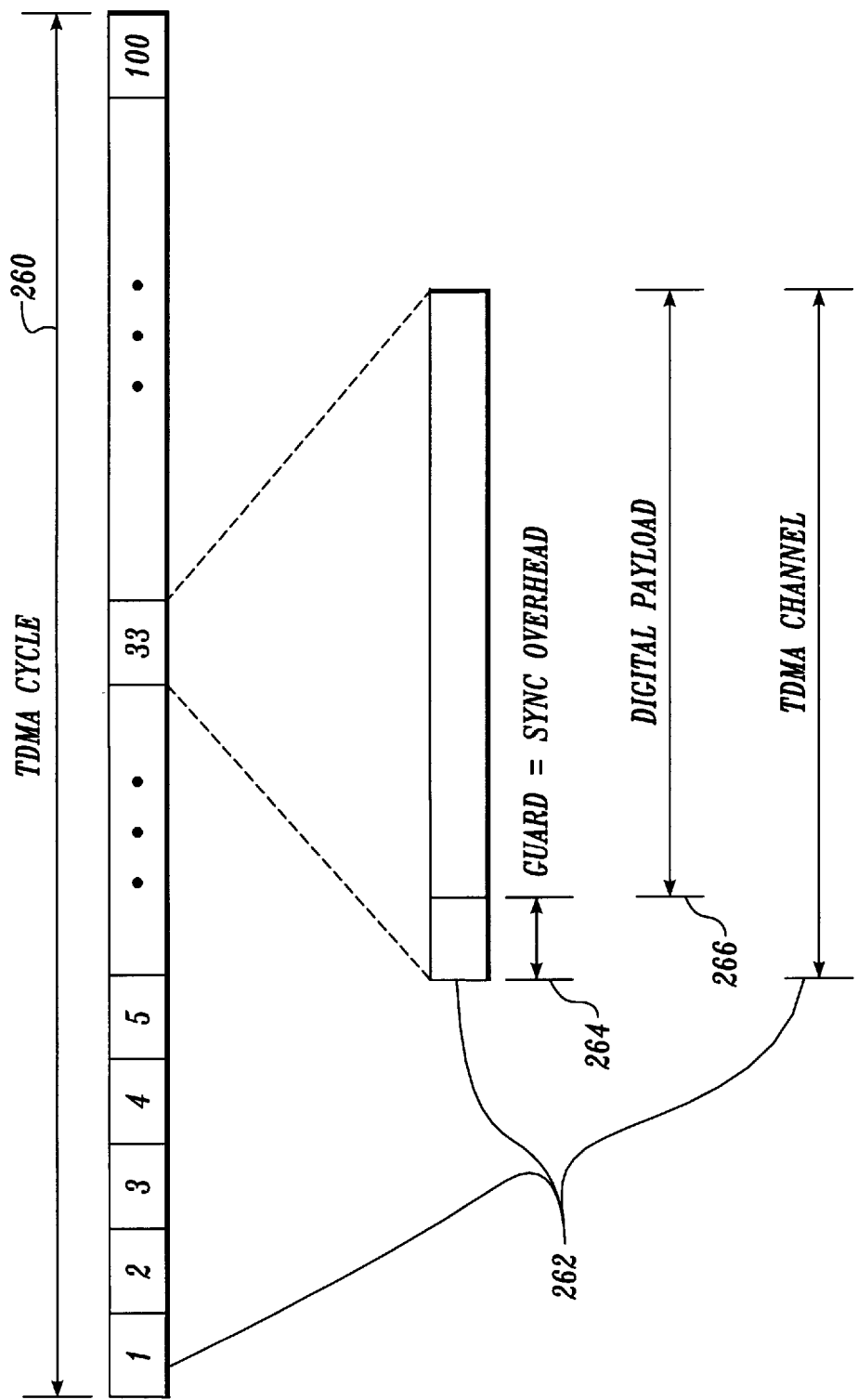
FIGS. 14 and 15 are block diagrams illustrating an example multiple access schemes used according to the present invention.

In TDMA, a particular time period is divided into time slots or channels 262 and grouped into a cycle 260, as shown in FIG. 14. A certain number of channels within the TDMA cycle 260, called control channels are reserved by the AV for network management functions such as signaling, paging and control. The remaining channels in the TDMA cycle 260 are called data channels and are used for information payload transmissions between mobile units. TDMA channels 262 are broken down further into the information payload 266 and a smaller guard and timing portion 264. The data channels 262 may also be used by the mobile units and the AV for network management functions while a connection is in progress. Allocation and deallocation of these data channels for various communication processes are managed by dynamic network management information within the AV in coordination with the OCC. The AV also maintains the timing reference for the transmit and receive TDMA cycles that are periodically repeated, described below with respect to FIG. 15.

Figure 15:
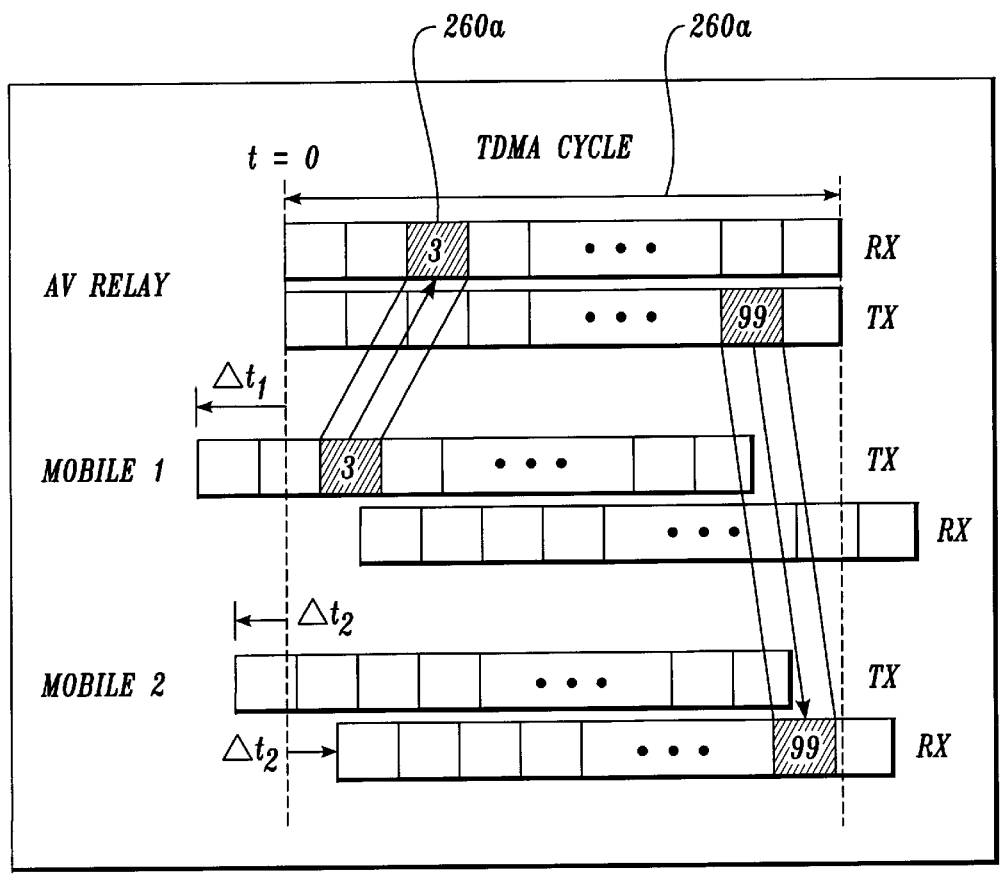

Using the control channels, the mobile units requesting connection setup are assigned a set of unique data channels according to network management information. Successful establishment of a connection between mobile units involves the AV communicating the allocated transmit and receive channel numbers to the respective mobile units. For example, as shown in FIG. 15, if a TDMA cycle 260a includes 100 channels, one mobile unit (Mobile 1) transmits on channel 3 and a second mobile unit (Mobile 2) receives on channel 99 of the TDMA cycle 260a. $\Delta t_1$ and $\Delta t_2$ are the propagation delays between the mobile units 1 and 2 and the AV, respectively. The mobile units are permitted to transmit only during the allocated transmit channel periods. However, the mobile units may receive data at any time. There is no requirement for the mobile unit receiver to be synchronized to the AV's transmit TDMA cycle's channel boundary. Timing for data transmissions and receptions onboard the AV are, however, scheduled on the transmit and receive TDMA cycle's channel boundaries respectively, i.e., data is transmitted and received on a predefined TDMA channel boundary. It is required that transmission and reception of data onboard the AV occurs on a channel boundary because both the transmit and receive hopping beam antenna need to be steered to geographically separated mobile units transmitting and receiving data during a particular channel period. On the other hand, the transmit and receive antenna on the mobile units are nominally directed at the AV. Therefore, once the mobile unit has completed the acquisition of the AV position and starts tracking it, there is no need for the mobile unit's antenna beams to move the AV.

Alternatively, if the mobile unit's antenna beams are used to serve other communication services such as monitoring signal strength from other neighboring AVs when not scheduled to communicate with the AV, then both the transmission and reception of data from and to the mobile unit would have to be scheduled on its transmit and receive TDMA cycle's channel boundary similar to the AV.

The AV's transmit and receive TDMA cycles are synchronized with each other, as shown in FIG. 15. Timing for corresponding transmit and receive channels are aligned with a zero time skew within the transmit and receive TDMA cycles. Therefore, timing for the transmit and receive TDMA cycles onboard the AV reference a single AV TDMA cycle. All mobile units in the domain serviced by the AV are time synchronized to the TDMA cycle timing established by the AV. Mobile units serviced by the AV periodically synchronize to the AV's TDMA cycle using either the control or data channels. The mobile unit's transmit TDMA cycle timing is advanced relative to the AV's TDMA cycle timing in order to compensate for the timing skew due to the propagation delay between the mobile unit and the AV, as shown by Mobile 1's $\Delta t_1$ advanced transmission in FIG. 15. Advancement of the mobile unit's transmit TDMA cycle ensures that its transmission to the AV on a given channel is received precisely at the TDMA cycle's channel boundary. Similarly, if the receive antenna on the mobile unit is being used for other communication purposes, timing for the mobile unit's receive TDMA cycles is delayed relative to the AV's TDMA cycle, as shown by $\Delta t_2$ time delayed Mobile 2's receive channel 99. The timing advance and delay for the mobile unit's transmit and receive TDMA cycles is a finction of the estimated one-way propagation delay between the mobile unit and the AV. All the mobile units and the AVs in the communication infrastructure are capable of determining their location and their global time reference. One approach to accomplish this is to receive GPS signals and determine from the signals global timing reference and position information. One-way propagation delay between the mobile unit and the AV is determined from the position information and timing reference. Though the AV and the mobile units have access to their location and global time reference, timing uncertainties do remain and a guard time is required within each channel to prevent transmission interference between adjacent channels. The guard time is based on GPS determined time and position and is a function of the worst case range uncertainty between the mobile unit and the AV and any AV or mobile unit clock errors.

The system described above facilitates broadband full-duplex connectivity between mobile units. The system is also capable of providing broadcast multipoint-to-multipoint communication to or between a set of mobile units. In this case a mobile unit transmits data to the AV within the channels allocated for the particular connection. The AV rebroadcasts the received data from the mobile unit, during its assigned channel, using an antenna with a broadbeam pattern. Manipulation of the individual phase registers of an AV's PAA hopping beam antenna or a conventional fixed pattern antenna can produce this broadbeam pattern. Transmission of data using a broadbeam pattern enables all the mobile units participating in the multipoint-to-multipoint connection serviced by the AV to receive the broadcast data. Hence, the AV's data transmission for a multipoint-to-multipoint connection utilizes a broadbeam antenna pattern while a narrow beam antenna pattern is used for a point-to-point connection. Since the AV's transmit antenna gain for a broadbeam pattern is lower than a narrow beam pattern, a multipoint-to-multipoint connection supports a lower signaling rate as compared with a point-to-point connection assuming the same transmitted effective isotropic radiated power. As an alternate approach, a conventional omnidirectional antenna may also be used to provide narrow band broadcast service to a set of mobile units. The alternate approach can be used to relay broadcast information to mobile units with receive-only capability. Transmission of the narrow band broadcast information can be accomplished by using one of the channels within the TDMA cycle or independent of the TDMA cycle using other VHF or UHF frequency channels.

Hopping Beam Channel Allocation

Since the bandwidth requirement for communication in a broadband mobile wireless network varies due to random demands, it is desirable to assign bandwidth on demand. The basic idea behind the dynamic bandwidth allocation is that control channels are permanently assigned for network management functions and data channels are stored in a dynamic channel pool and managed by the AV. When necessary, e.g., when a request for a new connection arrives on a control channel, the AV allocates the required number of data channels based on the user authorization, requested bandwidth, and channel availability. Upon the completion of a call the connection is released and the AV returns the allocated channels to the pool of available channels. Allocation and deallocation of channels is performed by the AV on a call-by-call basis. If channels are not available when a connection request is received by the AV, the connection setup is blocked and the call is refused. Connection management is initiated by the mobile unit using the control channel to transmit connection setup information to the AV. Connection setup information includes attributes such as source and destination fixed or mobile unit addresses and the required forward and reverse bandwidth for a duplex connection. The AV, upon receiving the connection setup information, determines the next-hop to reach the destination fixed or mobile unit based on the requested bandwidth, available data channels, and the optimal communication route to the destination mobile unit. Following this the AV reserves the required number of transmit and receive data channels for the connection and forwards the connection setup request to the next-hop. If a route to the destination fixed or mobile unit is not available, the AV rejects the call and transmits a reject indication to the source mobile unit along the path already established for the connection. Additionally, data channel allocations along the path already setup are released after the connection setup is rejected. This dynamic channel allocation procedure enables the AV to efficiently manage the available pool of data channels based on a demand assigned multiple access scheme.

Fast Packet Switch

Figure 16:
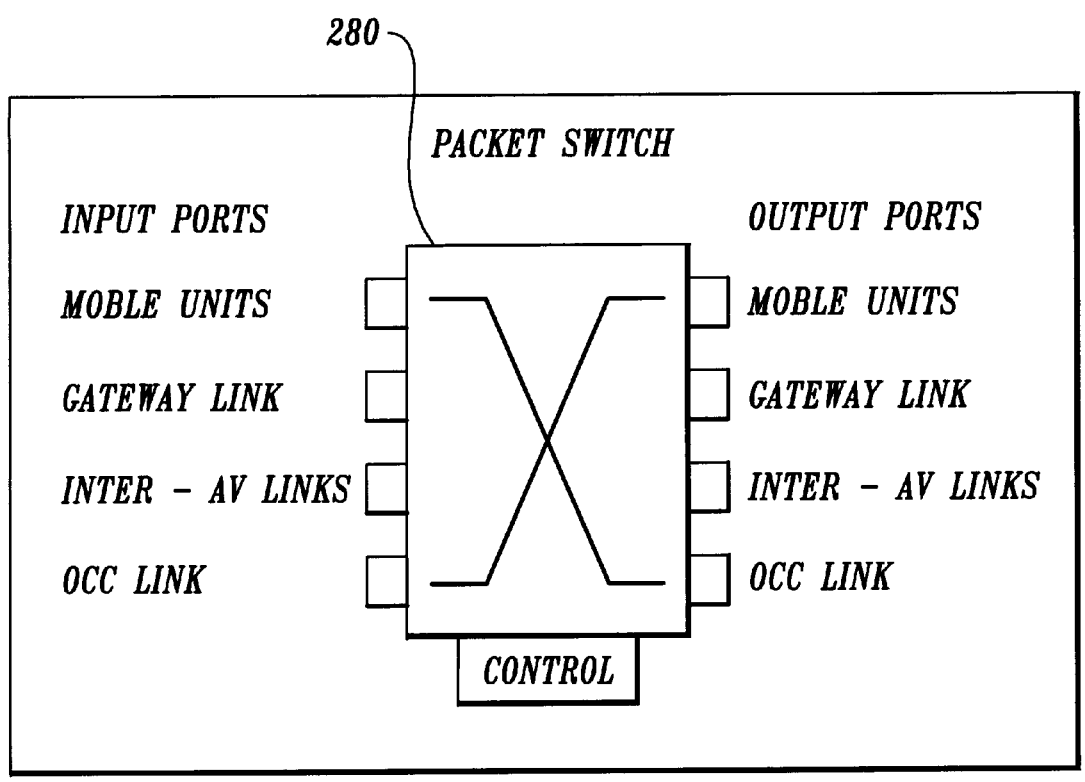
FIG. 16 is a block diagram illustrating the switching component in the airborne vehicles according to the present invention.

As shown in FIG. 16, each AV manages the routing of packetized data flowing through it via a fast packet switch (FPS) 280. The FPS 280 is located within the CPU 130 (FIG. 4). The FPS 280 examines the incoming packet header and determines whether the packet is part of a local control message or if it is to be routed elsewhere in the network. The input and output ports connect to mobile units, gateway links, inter-AV links and OCC links. Data packets are routed to the appropriate antenna and thereby to the recipient. The data packets are delivered within assigned data channels 262 (FIG. 14), if delivered by the directed beam antenna. The FPS 280 is operable with existing B-ISDN switching technology designed to implement wireline asynchronous transfer mode (ATM) networks. Therefore, the present invention is capable of wirelessly transmitting ATM cells, thus providing seamless communication with existing terrestrial networks.

Network Resource Management

Network management for the AV constellation is performed by the OCC 105 (FIG. 1). The various functions performed by the OCC 105 may be distributed geographically and may be mobile or relocatable to support rapid deployment of the network. The size of an AV constellation is not fixed and may vary over time as managed by the OCC 105. The OCC 105 coordinates the positioning of each AV 106 in the constellation 108 and manages the periodic replacement of members of the constellation. The OCC 105 keeps the aggregate constellation coverage area 120 fixed or shifts its position or shape over a period of time to accommodate dynamic mobile unit traffic patterns. The OCC 105 also manages network functions such as billing, service authorization and call authorization.

There are two types of OCC interfaces to the network. The first type is the interface to the AV constellation. This is accomplished via a staring beam from at least one member AV in the constellation. The OCC typically controls a single constellation but need not be limited to just one. For certain dense service regions several constellations could be controlled via a single OCC installation. Second, an OCC 105 can support one or more gateway interfaces to existing terrestrial or satellite telecommunication, broadband networks. This provides connectivity to the outside world for mobile units in the AV constellation. The gateway fimction may or may not be present at the OCC 105 and could optionally be located at separate facilities, such as a gateway station 110. The gateway station 110 is connected to the AV constellation 108 via a staring beam link to one or more member AVs 106.

Network Mobility Management

Management of communication resources and network interconnectivity is a crucial aspect in mobile connection oriented networks. Network mobility management consists of two principal functions: network registration and connection management.

Network registration is the association of the mobile unit location and address with terminals whose location and address is known to the entire network. Since the mobile unit may be in motion, it is important that the location of the mobile unit in the network system be known at any given instant. Addressing of the mobile unit is performed using its unique address without knowledge of its actual location in the network topology. Routing to the mobile unit from any particular terminal in the network system is not possible without information regarding the current location of the mobile unit. A network registration procedure determines the location of the mobile unit in the network topology. Each AV is augmented with mobility management functionality and hardware for wireless communication to the mobile units. The AV includes two databases: a home location register (HLR) or equivalently a home agent (HA) AV table and a visitor location register (VLR) or equivalently a foreign agent (FA) AV table. All mobile units are nominally associated with a single HA AV. Mobile units, however, may be attached to other AVs in the network topology called foreign agents. When mobile units are registered with foreign agents their home agent maintains their forwarding address in its HA AV table. All communication destined for mobile units is initially directed to their HAAV. If the mobile unit is currently not registered at the HA AV, the HA AV looks up its forwarding address and provides the address for the FA AV to which the mobile unit is currently attached.

Figure 17:
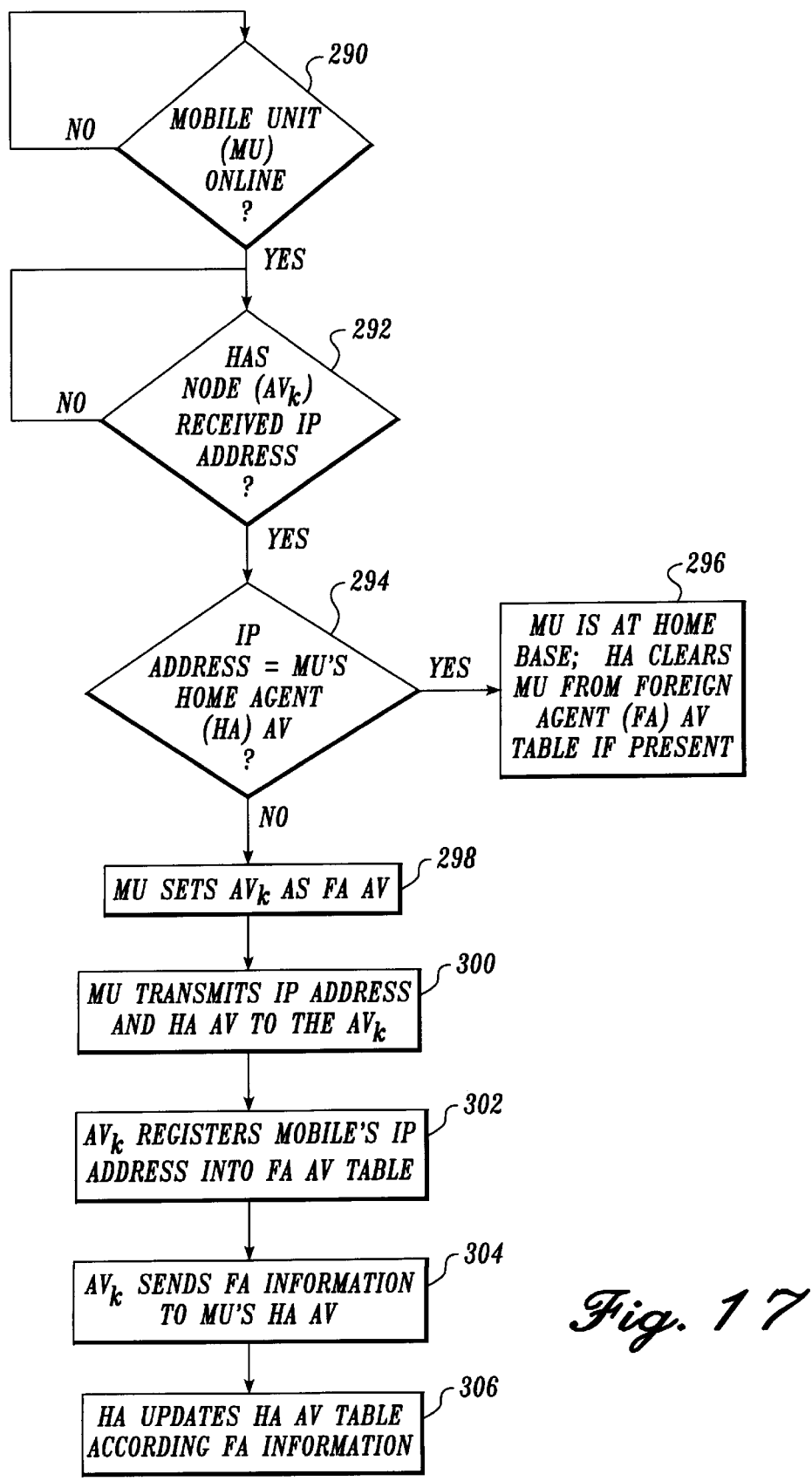
FIGS. 17–19 are flow diagrams illustrating various network management functionality according to the present invention.

To register, a mobile unit first establishes a RF communication link with an AV (described above with FIG. 9). As shown in FIG. 17 at block 290, once a RF communication link is established, the mobile unit initiates an address registration process. After the mobile unit receives address of the currently connected $AV_k$, at block 292, $AV_k$'s address is compared against the mobile unit's stored home agent address, at block 294. If the address of $AV_k$ is the same as the mobile unit's HA AV address, the mobile unit determines that it is currently attached to its HA AV and $AV_k$ updates the mobile unit location status in the HA AV table, at block 296. However, if the address of the $AV_k$ does not compare with the mobile unit's stored HA AV address, the mobile unit sets $AV_k$ as the FA AV, at block 298. Next, the mobile unit updates the $AV_k$ by transmitting its address and HA AV information to $AV_k$, at block 300. The $AV_k$ updates its FA AV table with the mobile unit's address and further provides forwarding address information to the mobile unit's designated HA AV, at block 304. The HA AV upon receiving information regarding relocation of the mobile unit will update its HA AV table with the FA AV information for the mobile unit, at block 306.

A mobile unit connected to an $AV_k$ may also initiate a deregistration process. This is accomplished by the mobile unit transmitting appropriate signaling information to the $AV_k$. Deregistration also initiates automatically if the RF communication link between the mobile unit and its $AV_k$ is severed.

Network Connection Setup/Release

Figure 18:
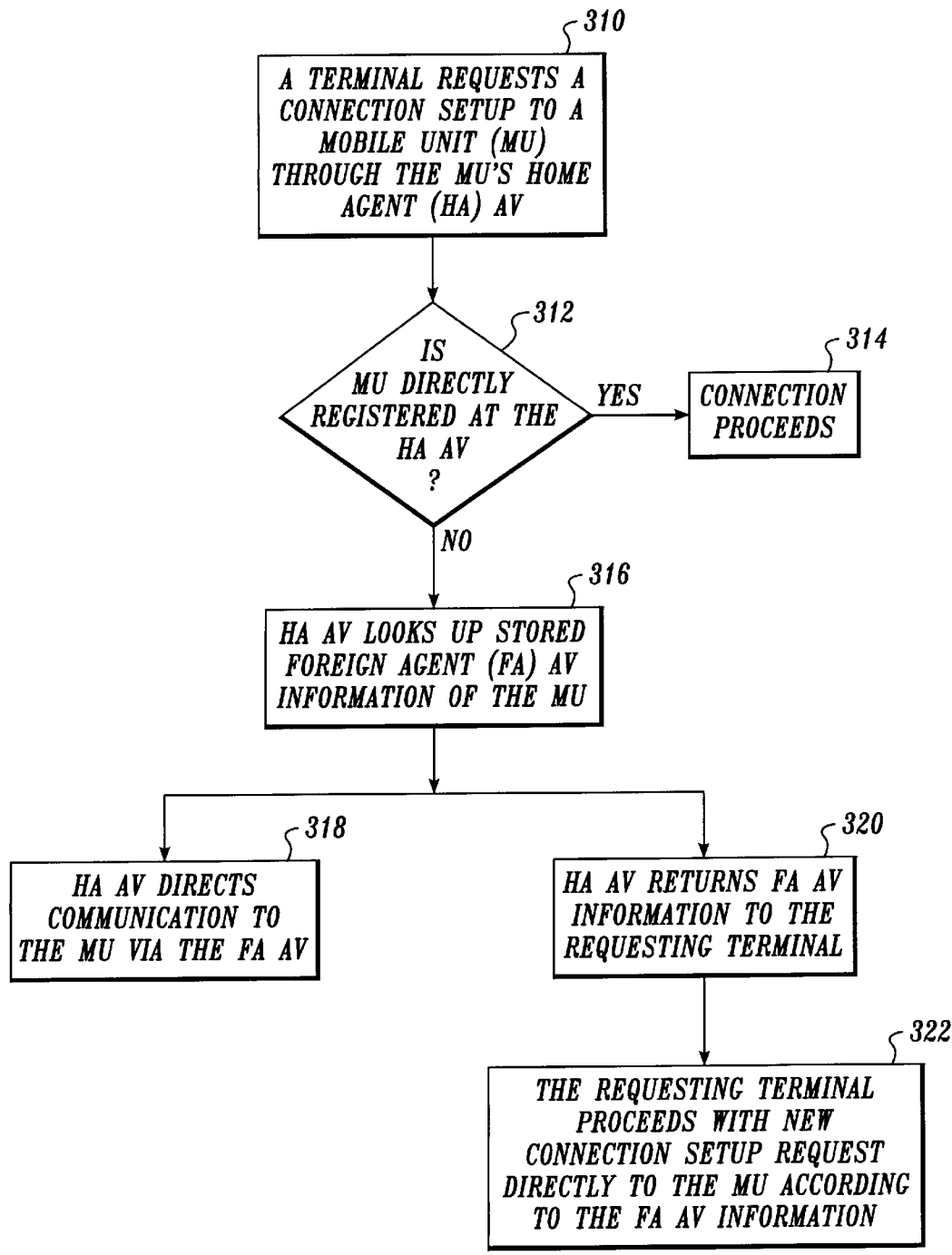

As shown in FIG. 18, a terminal requesting a connection setup to a mobile unit initiates the connection by transmitting a connection setup request to the mobile unit's HA AV, at block 310. If the mobile unit is currently registered at the HA AV the connection setup proceeds directly to the mobile unit from the HA AV, at blocks 312 and 314. However, if the mobile unit is not currently registered at the HA AV, the HA AV looks up the mobile unit's forwarding address in the HA AV's HA AV table, at block 316. Two approaches provide setup of the connection between the terminal and the mobile unit. In the first approach, all communication is redirected through the HA AV, at block 318. Redirection of communication to the mobile unit via its HA AV may not follow an optimal route and may potentially increase the usage of bandwidth resources. However, in the first approach terminals do not require added mobility management fumctionality, thereby minimizing network hardware complexity. In the second approach, the HA AV does not perform communication redirection functions described in the first approach. In this approach the designated HA AV looks up the FA AV currently maintaining connectivity with the mobile unit, at block 316, and returns this information to the calling terminal, at block 320. The calling terminal then proceeds with a new connection setup request to the mobile unit directly through the FA AV maintaining connectivity with the destination mobile unit, at block 322. In the second approach a more optimal route between the calling terminal and the mobile unit is established, however, it requires added mobility management fluctionality within each terminal that communicates with a mobile unit. In both approaches the mobile unit may only attach to an AV capable of performing all the mobility management functions.

The connection release process in a connection-oriented network is relatively simple. The calling terminal or the mobile unit may release the connection. The connection release process signals all the terminals or nodes in the connection path to release the connection and free the network resources. The calling terminal may be another mobile unit, an OCC, an ATM network connected entity, etc.

Network Connection Hand-off

Connection hand-off is required to maintain ongoing communication between a mobile unit and the calling terminal as the mobile unit traverses across AV coverage areas 109. The hand-off process maintains end-to-end connectivity. The effectiveness of hand-off-induced rerouting is determined by a number of criteria so as to minimize the service disruptions, latency, necessary buffering, and network complexity. First, a new connection to a new AV for a connection hand-off is established. In order to maintain communication in the above-mentioned connection-oriented network, the new connection is established before the current connection is dropped. This make-before-break concept enables soft hand-off and minimizes service disruption and latency. Hand-off initiation and the connection setup to the new AV is performed in a distributed manner. If the AV must initiate connection hand-offs, frequent connection hand-off events due to multiple fast-moving mobile units dramatically increase the processing load and complexity of an AV. Therefore, mobile units initiate hand-off. In this approach, hand-off decisions are distributed and each mobile unit independently evaluates the quality of its current wireless links and initiates a connection hand-off process when a more suitable wireless link is detected. Although this added link management and link quality decision process adds some complexity to the mobile unit, it greatly reduces the complexity at the AV and also reduces the processing capacity required at the AVs.

Figure 19:
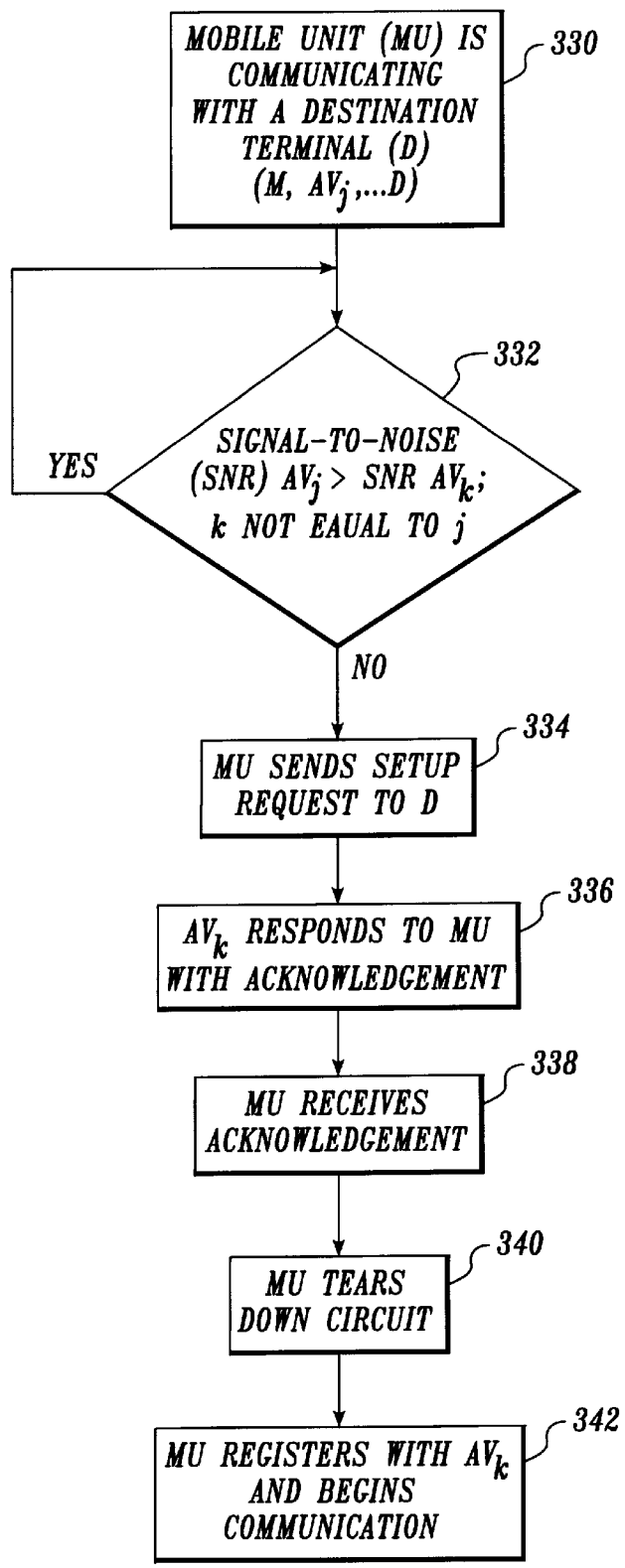

As shown in FIG. 19, a mobile unit communicating with a destination terminal (D), at block 330, continuously monitors the wireless link quality from its current and any adjacent AVs. All AVs in this scheme periodically transmit beacon signals over a paging channel so as to permit the mobile units to make wireless link quality checks of its current $AV_j$ and other AVs in the geographical vicinity. When the wireless link quality measurement or signal-to-ratio (SNR) from its current $AV_j$ falls below a predefined threshold limit or the SNR measurement of a nearby AV, and there exists an $AV_k$ that has better wireless link quality, the mobile unit initiates the connection hand-off procedure, at block 332. The hand-off process establishes a new connection between a calling terminal and the new $AV_k$, at block 334. Once the new connection between the calling terminal and the new $AV_k$ has been set up, an indication is sent to the mobile unit, at block 336. At this point, data transmission from the calling terminal is multicast to the current and new AVs. The mobile unit, on receiving acknowledgment of connection setup completion, at block 338, releases its current connection with $AV_j$, at block 340, and switches to the new $AV_k$. Upon establishing the wireless link to the new $AV_k$, the mobile unit resumes ongoing communication to the destination terminal and also registers with the new $AV_k$, at block 342. Establishment of the connection to the new $AV_k$ before the mobile unit drops the old $AV_j$ in accordance to the make-before-break concept of soft hand-off alleviates any connection hand-off disruptions.

If the first connection setup approach described above with FIG. 18 is adopted, the mobile unit's home agent performs both the address server and communication redirection functions. Then, during hand-off the connection between the calling terminal and the mobile unit's home agent is not disturbed. The new connection is setup between the mobile unit's home agent and the new $AV_k$ and following hand-off the connection between mobile unit's home agent and the current $AV_j$ is released. Alternatively, if the second connection setup approach described above with FIG. 18 is adopted, the mobile unit's home agent only performs address server functions. The new connection is setup directly between the calling terminal and the new $AV_k$. Following hand-off the connection between the calling terminal and the current $AV_j$ is released.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A communication system for wireless broadband communication, comprising:
   a plurality of ground based users; and
   an airborne vehicle for exchanging communication data with at least one user of said plurality of users within a predefined coverage area, said airborne vehicle comprising:
      an altitude determining mechanism for generating attitude reference information;
      a position determining means for generating airborne vehicle position information and position information of users within the airborne vehicle's coverage area;
      a central processing unit for generating targeting signals according to said generated attitude reference information and position information;
      an assigning means for assigning at least one transmit and at least one receive data channel of a predefined transmission scheme to each user, wherein data channel transmission and reception occur at different time intervals according to a predefined timing protocol;
      a receive directed beam antenna for receiving data according to said assigned at least one receive data channel and said generated targeting signals;
      a switching means for determining the destination user of said received data; and
      a transmit directed beam antenna for transmitting said received data to said determined destination user according to said assigned at least one transmit data channel and said generated targeting signals.

2. The system of claim 1, wherein each of said plurality of users comprises:
   an attitude determining mechanism for generating attitude reference information;
   a position determining means for generating position information;
   a central processing unit for generating targeting signals according to said generated inertial reference information and position information; and
   transmit and receive antennas for receiving and transmitting data according to said generated targeting signals and said predefined transmission scheme.

3. The system of claim 1, having a plurality of airborne vehicles servicing geographically distinct coverage areas, wherein said plurality of airborne vehicles further comprises a network antenna for transmitting data to other airborne vehicles if a determined destination user of received data is located in a coverage area serviced by another airborne vehicle, the network antenna transmitting the received data to the other airborne vehicle which determines the user destination of the data and transmits the data to the user in the other airborne vehicle's coverage area.

4. The system of claim 3, further comprising an operations controller with a wireless communication link to at least one of the airborne vehicles for supplying operations controlling information.

5. The system of claim 4, wherein said operations controller further comprises a link to a public or private external data network for generating communication links between users in coverage areas serviced by the plurality of airborne vehicles and stations connected to the external data network.

6. The system of claim 1, wherein said transmit and receive directed beam antennas are phased array antennas.

7. The system of claim 6, wherein said central processing unit includes means for generating the targeting signals to direct separate user targeting of said transmit and receive phased array antennas.

8. The system of claim 6, wherein said phased array antennas comprise phased array elements, wherein each phased array element comprises a double buffered shift register prestoring targeting signals according to the assigned data channels in the transmission scheme.

9. The system of claim 1, wherein said switching means is a fast packet switch.

10. The system of claim 1, wherein said transmission scheme is TDMA.

11. The system of claim 1, wherein said airborne vehicles are manned or unmanned.

12. A mobile communication system for wirelessly communication, comprising:
   a plurality of ground based users, and
   a plurality of airborne vehicles, each airborne vehicle servicing a predefined coverage area, each airborne vehicle further comprising:

a position determining means for generating airborne vehicle position information and position information of the users within the airborne vehicle's coverage area;

a central processing unit for generating targeting signals according to said generated airborne vehicle and user position information;

an assigning means for assigning at least one transmit and at least one receive data channel of a predefined transmission scheme to each user, wherein the at least one transmit and receive data channels occur at different time intervals according to a predefined timing protocol;

a receive directed beam antenna for receiving data according to said generated targeting signals and said assigned at least one receive data channel;

a switching means for determining a destination user of said received data;

a transmit directed beam antenna for transmitting said received data to said determined destination user at said assigned transmit data channel according to said generated targeting signals, if the determined destination user is within the coverage area of the airborne vehicle; and a network antenna for transmitting data to other airborne vehicles, if the determined destination user of received data is located in a coverage area serviced by another airborne vehicle, the network antenna transmitting the received data to the other airborne vehicle which determines the user destination of the data and transmits the data to the user in the other airborne vehicle's coverage area.

13. The system of claim 12, wherein each of said plurality of users comprises:

a position determining means for generating user position information of each user of said plurality of users;

a central processing unit for generating targeting signals according to said generated user position information; and transmit and receive antennas for receiving and transmitting data according to said generated targeting signals and said predefined transmission scheme.

14. The system of claim 12, further comprising an operations controller with a wireless communication link to at least one airborne vehicle for supplying operations controlling information to the airborne vehicles.

15. The system of claim 14, wherein said operations controller further comprises a communication link to a public data network for generating communication links between users in coverage areas serviced by the plurality of airborne vehicles and stations connected to the public data-network.

16. The system of claim 12, wherein said transmit and receive directed beam antennas are phased array antennas.

17. The system of claim 16, wherein said central processing unit includes means for generating the targeting signals to direct separate user targeting of said transmit and receive phased array antennas.

18. The system of claim 16, wherein said phased array antennas comprise phased array elements, each phased array element comprising a double buffered shift register prestoring targeting signals according to said assigned data channels in said transmission scheme.

19. The system of claim 12, wherein said switching means is a fast packet switch.

20. The system of claim 12, wherein said transmission scheme is TDMA.

21. The system of claim 12, wherein said airborne vehicles are manned or unmanned.

22. An airborne vehicle for transmitting and receiving communication data from a plurality of users within a predefined coverage area, said airborne vehicle further comprising:

an attitude determining mechanism for generating attitude reference information;

a position determining means for generating position information of said at least one airborne vehicle relative to each of the plurality of users;

a central processing unit for generating targeting signals according to said generated attitude reference information and position information;

an assigning means for assigning at least one transmit and at least one receive data channel of a predefined transmission scheme to each user, wherein data channel transmission and reception occurs at different time intervals of a predefined timing protocol;

a receive directed beam antenna for receiving data according to said generated targeting signals;

a switching means for determining the destination of said received data; and a transmit directed beam antenna for transmitting said received data to said determined destination at said assigned transmit data channel according to said assigned data channels and said generated targeting signals.

23. The system of claim 22, wherein said transmit and receive directed beam antennas are phased array antennas.

24. The system of claim 23, wherein said central processing unit includes means for generating the targeting signals to direct separate user targeting of said transmit and receive phased array antennas.

25. The system of claim 23, wherein said phased array antennas comprise phased array elements comprising a double buffered shift register for prestoring targeting signals for each phased array element of the phased array antennas.

26. The system of claim 22, wherein said switching means is a fast packet switch.

27. The system of claim 22, wherein said transmission scheme is TDMA.

28. The system of claim 22, wherein said airborne vehicles are unmanned.

29. A method for wirelessly communicating between a plurality of users by use of an airborne vehicle servicing a coverage area, comprising:

determining attitude reference information and position information of each user of said plurality of users and of said at least one airborne vehicle relative to each of the plurality of users within the coverage area;

generating targeting signals according to said generated attitude reference information and position information;

assigning at least one transmit and at least one receive data channel of a predefined transmission scheme to each user, wherein data channel transmission and reception occur at different time intervals of a predefined timing protocol;

receiving data from each user at said assigned receive data channel according to said generated targeting signals using a first directed beam antenna;

determining the destination of said received data; and transmitting said received data to said determined destination at said assigned transmit data channel according to said assigned data channels and said generated targeting signals using a second beam antenna.

30. The method of claim 29, wherein the directed beam antennas are phased array antennas.

31. The method of claim 30, wherein the generating of targeting signals generates separate boresight information for the transmit and receive phased array antennas.

32. The method of claim 30, wherein said phased array antennas comprise phased array elements each phased array element comprising a double buffered shift register for prestoring targeting signals for each phased array element of the phased array antennas.

* * * * *